(12) United States Patent
Shah et al.

(10) Patent No.: US 7,702,614 B1
(45) Date of Patent: Apr. 20, 2010

(54) INDEX UPDATING USING SEGMENT SWAPPING

(75) Inventors: Nirav Shah, Sunnyvale, CA (US); Trevor McCulloch, San Mateo, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 11/694,789

(22) Filed: Mar. 30, 2007

(51) Int. Cl.
*G06F 7/00* (2006.01)
*G06F 17/30* (2006.01)
*G06F 12/00* (2006.01)

(52) U.S. Cl. ............................................. 707/1; 3/200
(58) Field of Classification Search .................. 707/1–5, 707/7, 100, 200, 203
See application file for complete search history.

(56) References Cited

U.S. PATENT DOCUMENTS

| | | |
|---|---|---|
| 5,321,833 A | 6/1994 | Chang et al. |
| 5,495,567 A | 2/1996 | Iizawa et al. |
| 5,523,946 A | 6/1996 | Kaplan et al. |
| 5,638,543 A | 6/1997 | Pedersen et al. |
| 5,696,962 A | 12/1997 | Kupiec |
| 5,724,571 A | 3/1998 | Woods |
| 5,754,939 A | 5/1998 | Herz et al. |
| 5,771,378 A | 6/1998 | Holt et al. |
| 5,826,261 A | 10/1998 | Spencer |
| 5,835,087 A | 11/1998 | Herz et al. |
| 5,864,863 A | 1/1999 | Burrows |
| 5,915,249 A | 6/1999 | Spencer |
| 5,920,854 A | 7/1999 | Kirsch et al. |
| 5,956,722 A | 9/1999 | Jacobson et al. |
| 5,960,383 A | 9/1999 | Fleischer |
| 5,963,965 A * | 10/1999 | Vogel .......................... 715/236 |
| 5,983,216 A | 11/1999 | Kirsch et al. |
| 6,021,409 A | 2/2000 | Burrows |
| 6,070,158 A | 5/2000 | Kirsch et al. |
| 6,085,186 A | 7/2000 | Christianson et al. |
| 6,098,034 A | 8/2000 | Razin et al. |
| 6,178,419 B1 | 1/2001 | Legh-Smith et al. |
| 6,185,550 B1 | 2/2001 | Snow et al. |

(Continued)

FOREIGN PATENT DOCUMENTS

WO 2009/033098 A1 3/2009

OTHER PUBLICATIONS

Jones, S. et al., "Topic-Based Browsing Within a Digital Library Using Keyphrases", Proceedings of the Fourth ACM conference on Digital Libraries (Aug. 11 - 14, 1999), ACM Press, pp. 114-121.

(Continued)

*Primary Examiner*—Don Wong
*Assistant Examiner*—Merilyn P Nguyen

(57) ABSTRACT

An information retrieval system uses phrases to index, retrieve, organize and describe documents. Phrases are extracted from the document collection. Documents are the indexed according to their included phrases, using phrase posting lists. The phrase posting lists are stored in an cluster of index servers. The phrase posting lists can be tiered into groups, and sharded into partitions. Phrases in a query are identified based on possible phrasifications. A query schedule based on the phrases is created from the phrases, and then optimized to reduce query processing and communication costs. The execution of the query schedule is managed to further reduce or eliminate query processing operations at various ones of the index servers.

10 Claims, 12 Drawing Sheets

U.S. PATENT DOCUMENTS

| | | | |
|---|---|---|---|
| 6,185,558 B1 | 2/2001 | Bowman et al. |
| 6,298,344 B1 | 10/2001 | Inaba et al. |
| 6,349,316 B2 | 2/2002 | Fein et al. |
| 6,363,377 B1 | 3/2002 | Kravets et al. |
| 6,366,911 B1 | 4/2002 | Christy |
| 6,366,933 B1 | 4/2002 | Ball et al. |
| 6,415,283 B1 | 7/2002 | Conklin |
| 6,470,307 B1 | 10/2002 | Turney |
| 6,499,030 B1 | 12/2002 | Igata |
| 6,542,888 B2 | 4/2003 | Marques |
| 6,549,895 B1 | 4/2003 | Lai |
| 6,549,897 B1 | 4/2003 | Katariya et al. |
| 6,571,240 B1 | 5/2003 | Ho et al. |
| 6,594,658 B2 | 7/2003 | Woods |
| 6,596,030 B2 | 7/2003 | Ball et al. |
| 6,638,314 B1 | 10/2003 | Meyerzon et al. |
| 6,654,739 B1 | 11/2003 | Apte et al. |
| 6,684,183 B1 | 1/2004 | Korall et al. |
| 6,691,106 B1 | 2/2004 | Sathyanarayan |
| 6,741,981 B2 | 5/2004 | McGreevy |
| 6,741,982 B2 | 5/2004 | Soderstrom et al. |
| 6,741,984 B2 | 5/2004 | Zaiken et al. |
| 6,769,016 B2 | 7/2004 | Rothwell et al. |
| 6,772,150 B1 | 8/2004 | Whitman et al. |
| 6,778,970 B2 | 8/2004 | Au |
| 6,778,980 B1 | 8/2004 | Madan et al. |
| 6,820,237 B1 | 11/2004 | Abu-Hakima et al. |
| 6,823,333 B2 | 11/2004 | McGreevy |
| 6,832,224 B2 | 12/2004 | Gilmour |
| 6,839,682 B1 | 1/2005 | Blume et al. |
| 6,859,800 B1 | 2/2005 | Roche et al. |
| 6,862,710 B1 | 3/2005 | Marchisio |
| 6,886,010 B2 | 4/2005 | Kostoff |
| 6,910,003 B1 | 6/2005 | Arnold et al. |
| 6,978,274 B1 | 12/2005 | Gallivan et al. |
| 6,981,040 B1 | 12/2005 | Konig et al. |
| 6,983,345 B2 | 1/2006 | Lapir et al. |
| 6,997,793 B1 | 2/2006 | Ito |
| 7,028,026 B1 | 4/2006 | Yang et al. |
| 7,051,023 B2 | 5/2006 | Kapur et al. |
| 7,051,024 B2 | 5/2006 | Fein et al. |
| 7,058,589 B1 | 6/2006 | Leamon |
| 7,085,771 B2 | 8/2006 | Chung et al. |
| 7,089,236 B1 | 8/2006 | Stibel |
| 7,137,062 B2 | 11/2006 | Kaufman et al. |
| 7,137,065 B1 | 11/2006 | Huang et al. |
| 7,139,756 B2 | 11/2006 | Cooper et al. |
| 7,149,748 B1 | 12/2006 | Stephan |
| 7,152,064 B2 * | 12/2006 | Bourdoncle et al. ............ 707/5 |
| 7,158,983 B2 | 1/2007 | Willse et al. |
| 7,171,619 B1 | 1/2007 | Bianco |
| 7,194,483 B1 | 3/2007 | Mohan et al. |
| 7,200,802 B2 | 4/2007 | Kawatani |
| 7,206,389 B1 | 4/2007 | Dumoulin et al. |
| 7,240,064 B2 | 7/2007 | Risvik et al. |
| 7,243,092 B2 | 7/2007 | Woehler et al. |
| 7,254,580 B1 | 8/2007 | Gharachorloo et al. |
| 7,263,530 B2 | 8/2007 | Hu et al. |
| 7,346,839 B2 | 3/2008 | Acharya et al. |
| 7,356,528 B1 * | 4/2008 | Amer-Yahia et al. ........... 707/5 |
| 7,395,501 B2 | 7/2008 | Graham et al. |
| 7,426,507 B1 | 9/2008 | Patterson |
| 7,428,529 B2 | 9/2008 | Zeng et al. |
| 7,454,449 B2 | 11/2008 | Plow et al. |
| 7,506,338 B2 | 3/2009 | Alpern et al. |
| 7,536,408 B2 | 5/2009 | Patterson |
| 7,567,959 B2 | 7/2009 | Patterson |
| 7,580,921 B2 | 8/2009 | Patterson |
| 7,580,929 B2 | 8/2009 | Patterson et al. |
| 2001/0000356 A1 | 4/2001 | Woods |
| 2001/0021938 A1 | 9/2001 | Fein et al. |
| 2002/0042707 A1 | 4/2002 | Zhao et al. |
| 2002/0042793 A1 | 4/2002 | Choi |
| 2002/0046018 A1 | 4/2002 | Marcu et al. |
| 2002/0052901 A1 | 5/2002 | Guo et al. |
| 2002/0065857 A1 | 5/2002 | Michalewicz et al. |
| 2002/0078090 A1 | 6/2002 | Hwang et al. |
| 2002/0091671 A1 | 7/2002 | Prokoph |
| 2002/0138467 A1 | 9/2002 | Jacobson et al. |
| 2002/0143524 A1 | 10/2002 | O'Neil et al. |
| 2002/0147578 A1 | 10/2002 | O'Neil et al. |
| 2002/0174113 A1 | 11/2002 | Kanie et al. |
| 2002/0184380 A1 | 12/2002 | Weider et al. |
| 2002/0188587 A1 | 12/2002 | McGreevy |
| 2002/0188599 A1 | 12/2002 | McGreevy |
| 2003/0031996 A1 | 2/2003 | Robinson |
| 2003/0037041 A1 | 2/2003 | Hertz |
| 2003/0051214 A1 | 3/2003 | Graham et al. |
| 2003/0069877 A1 | 4/2003 | Grefenstette et al. |
| 2003/0078913 A1 | 4/2003 | McGreevy |
| 2003/0093790 A1 | 5/2003 | Logan et al. |
| 2003/0130993 A1 | 7/2003 | Mendelevitch et al. |
| 2003/0135495 A1 | 7/2003 | Vagnozzi |
| 2003/0144995 A1 | 7/2003 | Franz et al. |
| 2003/0191627 A1 | 10/2003 | Au |
| 2003/0195877 A1 | 10/2003 | Ford et al. |
| 2004/0006736 A1 | 1/2004 | Kawatani |
| 2004/0034633 A1 | 2/2004 | Rickard |
| 2004/0052433 A1 | 3/2004 | Henry et al. |
| 2004/0064438 A1 | 4/2004 | Kostoff |
| 2004/0068396 A1 | 4/2004 | Kawatani |
| 2004/0133560 A1 | 7/2004 | Simske |
| 2004/0158580 A1 | 8/2004 | Carmel et al. |
| 2004/0186824 A1 | 9/2004 | Delic et al. |
| 2004/0186827 A1 | 9/2004 | Anick et al. |
| 2004/0225667 A1 | 11/2004 | Hu |
| 2004/0260692 A1 | 12/2004 | Brill et al. |
| 2005/0043940 A1 | 2/2005 | Elder |
| 2005/0060295 A1 | 3/2005 | Gould et al. |
| 2005/0060651 A1 | 3/2005 | Anderson |
| 2005/0071310 A1 | 3/2005 | Eiron et al. |
| 2005/0071328 A1 | 3/2005 | Lawrence |
| 2005/0154723 A1 | 7/2005 | Liang |
| 2005/0165778 A1 | 7/2005 | Obata et al. |
| 2005/0203924 A1 | 9/2005 | Rosenberg |
| 2005/0216564 A1 | 9/2005 | Myers et al. |
| 2005/0234879 A1 | 10/2005 | Zeng et al. |
| 2005/0256848 A1 | 11/2005 | Alpert et al. |
| 2005/0278620 A1 | 12/2005 | Baldwin et al. |
| 2006/0018511 A1 | 1/2006 | Patterson |
| 2006/0020571 A1 | 1/2006 | Patterson |
| 2006/0020607 A1 * | 1/2006 | Patterson .................... 707/100 |
| 2006/0031195 A1 | 2/2006 | Patterson |
| 2006/0036593 A1 | 2/2006 | Dean et al. |
| 2006/0053157 A1 | 3/2006 | Pitts |
| 2006/0106792 A1 * | 5/2006 | Patterson ...................... 707/5 |
| 2006/0143174 A1 | 6/2006 | Dey et al. |
| 2006/0143714 A1 | 6/2006 | Peterson et al. |
| 2006/0200464 A1 | 9/2006 | Gideoni et al. |
| 2006/0212441 A1 | 9/2006 | Tang et al. |
| 2006/0268742 A1 | 11/2006 | Chu et al. |
| 2007/0033165 A1 | 2/2007 | Sheinwald et al. |
| 2007/0156677 A1 | 7/2007 | Szabo |
| 2008/0005064 A1 | 1/2008 | Sarukkai |
| 2008/0306943 A1 | 12/2008 | Patterson et al. |
| 2008/0319971 A1 | 12/2008 | Patterson |
| 2009/0070312 A1 | 3/2009 | Patterson |
| 2009/0330981 A1 | 3/2009 | Patterson |

OTHER PUBLICATIONS

Garner, H. et al., "Gene Alert - A Sequence Search Results Keyword Parser", IEEE Engineering in Medicine and Biology Magazine, vol. 17 (Mar.-Apr. 1998), pp. 119-122.

Fetterly, D. et al., "Detecting Phrase-Level Duplication on the World Wide Web", Proceedings of the 28th annual International ACM SIGIR Conference on Research and Development in Information Retrieval (Aug. 15-19, 2005), pp. 170-177.

Ntoulas, et al., "Detecting Spam Web Pages Through Content Analysis", Proceedings of the 15th International Conference on World Wide Web 2006 (May 23-26, 2006), pp. 83-92.

Examiner's First Report on Australian Patent Application No. 2005203240, mailed Sep. 13, 2007, 2 pages.

Examiner's First Report on Australian Patent Application No. 2005203238, mailed Sep. 10, 2007, 2 pages.

Examiner's First Report on Australian Patent Application No. 2005203239, mailed Sep. 13, 2007, 2 pages.

Caropreso, M.F., et al., "Statistical Phrases in Automated Text Categorization", Technical Report: 2000-B4-007 P (2000), 18 pages.

Schutze, et al., "A Cooccurrence-based Thesaurus and Two Applications to Information Retrieval", Information Processing & Management, vol. 33, No. 3 (1997), pp. 307-318.

International Search Report and Written Opinion for PCT Application No. PCT/US2006/02709 mailed on Jun. 21, 2007, 9 pages.

Chang, C.T. K. et al., "Performance and Implications of Semantic Indexing in a Distributed Environment", Proceedings of the 8th International Conference on Information Knowledge Management (1999), pp. 391-398.

Chen, H. et al., "Automatic Thesaurus Generation for an Electronic Community System", Journal of the American Society for Information Science, vol. 46 No. 3 (Apr. 1, 1995), pp. 175-193.

Cheung, F. et al., "An Efficient Algorithm for Incremental Update of Concept Spaces", University of Hong Kong Technical Report (Sep. 2002), pp. 1-16.

European Search Report for EP Patent Application No. EP05254644. 7, mailed Oct. 21, 2005, 10 pages.

European Search Report for EP Patent Application No. EP05254645. 4, mailed Sep. 21, 2005, 12 pages.

European Search Report for EP Patent Application No. EP05254646. 2, mailed Oct. 11, 2005, 11 pages.

European Search Report for EP Patent Application No. EP05254647. 0, mailed Oct. 4, 2005, 10 pages.

Gedeon, T. D., et al., "Hierarchical Co-Occurrence Relations.", IEEE International Conference on Systems, Man, and Cybernetics, vol. 3 (Oct. 11 - 14, 1998), pp. 2750-2755.

House, D., "Save Web Time with WebSumm", The Edge, vol. 1, No. 2 (Jul. 1997), pp. 1-3.

Jing, Y. et al., "An Association Thesaurus for Information Retrieval.", Proceedings of RIAO-94, 4th International Conference on Intelligent Multimedia Information Retrieval Systems and Management (Oct. 11-13, 1994), pp. 1-15.

Kando, N. "Text Structure Analysis as a Tool to Make Retrieved Documents Usable", Proceedings of the 4th International Workshop on Information Retrieval With Asian Languages (Nov. 11, 1999), pp. 1-10.

Leroy, G. et al., "Meeting Medical Terminology Needs - The Ontology-Enhanced Medical Concept Mapper", IEEE Transactions on Information Technology in Biomedicine, vol. 5, No. 4 (Dec. 2001), pp. 261-270.

Jones, S. et al., "Interactive Document Summarisation Using Automatically Extracted Keyphrases", Proceedings of the 35th Annual Hawaii International Conference on System Sciences (2002), pp. 1160-1169.

Lin, C. S., et al., "An Automatic Indexing and Neural Network Approach to Concept Retrieval and Classification of Multilingual (Chinese-English) Documents", IEEE Transactions on Systems, Man and Cybernetics. Part B: Cybernetics, vol. 26, No. 1 (Feb. 1, 1996), pp. 75-88.

Mandala, R. et al., "Combining Multiple Evidence From Different Types of Thesaurus for Query Expansion", Proceedings of SIGIR'99 22nd International Conference on Research and Development in Information Retrieval, Association for Computing Machinery (Aug. 1999), pp. 191-197.

Nguyen, H. V., et al., "Mining 'Hidden Phrase' Definitions from the Web", Proceedings of the Fifth Asia-Pacific Web Conference (Apr. 2003), Apr. 2003, pp. 1-11.

Pretschner, A. et al., "Ontology Based Personalized Search", Proceedings of the 11th IEEE International Conference on Tools with Artificial Intelligence (Nov. 1999), pp. 391-398.

Srinivasan, P. "Optimal Document-Indexing Vocabulary for Medline" Information Processing & Management, vol. 32 No. 5 (Sep. 1996), pp. 503-514.

Yun, Bo-Hyun et al., "Semantic-Based Information Retrieval for Content Management and Security", Computational Intelligence, vol. 19, No. 2 (May 2003), pp. 87-110.

Ahonen-Myka, Helena et al., "Finding Co-Occurring Text Phrases by Combining Sequence and Frequent Set Discovery", Proceedings of 16th International Joint Conference on Artificial Intelligence IJCAI-99 Workshop on Text Mining: Foundations Techniques and Applications (Jul. 31, 1999), pp. 1-9.

Chen, Hsinchun et al., "Automatic Construction of Networks of Concepts Characterizing Document Databases", IEEE Transactions on Systems, Man, and Cybernetics, vol. 22, No. 5 (Sep./Oct. 1992), pp. 885-902.

Examiner's First Report on Australian Patent Application No. 2005203237, mailed Sep. 11, 2007, 2 pages.

Ahmed, S. et al., "Word Stemming to Enhance Spam Filtering", First Conference on Email and Anti-Spam (CEAS) 2004 Proceedings (Jul. 30-3,1 2004), 2 pages.

First Office Action (English translation) from the State Intellectual Property Office for Chinese Patent Application No. 200510085372. X, mailed Mar. 28, 2008, 19 pages.

First Office Action (English translation) from the State Intellectual Property Office for Chinese Patent Application No. 200510085370.0, mailed Apr. 2008, 14 pages.

First Office Action (English translation) from the State Intellectual Property Office for Chinese Patent Application No. 200510085371.5, mailed Apr. 22, 2008, 10 pages.

First Office Action (English translation) from the State Intellectual Property Office for Chinese Patent Application No. 2005100853714, mailed Mar. 7, 2008, 4 pages.

Notice of Allowance for U.S. Appl. No. 10/1900,055, mailed Dec. 12, 2007, 20 pages.

Jagadeesh, J. et al., "Sentence Extraction Based Single Document Summarization", International Institute of Information Technology (Mar. 19-20, 2005), 5 pages.

Aizawa, A "An information-theoretic perspective of tf-idf measures", Information Processing and Management, vol. 1, No. 39 (2003), pp. 45-65.

International Search Report and Written Opinion for PCT Application No. PCT/US2008175492, mailed November 18, 2008, 10 pages.

Notice of Allowance for U.S. Appl. No. 10/1900,021, mailed Jun. 24, 2008, 7 pgs.

Notice of Allowance for U.S. Appl. No. 10/1900,259, mailed Jan. 23, 2008 15 pgs.

Notice of Allowance for U.S. Appl. No. 10/900,075, mailed Aug. 22, 2008, 14 pgs.

Notice of Allowance for U.S. Appl. No. 10/900,012, mailed Sep. 12, 2008, 9 pgs.

US 7,430,556, 09/2008, Patterson (withdrawn)

* cited by examiner

Example Values: N=10,000 Phrase Posting Lists (N1-N10,000), 1 Shard

Example Values: N=1,000 Phrase Posting Lists (R1-R1000), S.2=10 Shards

Example Values: N=100 Phrase Posting Lists (Q1-Q100), S.2=1000 Shards

INDEX UPDATING USING SEGMENT SWAPPING

CROSS REFERENCE TO RELATED APPLICATIONS

The application is related to the following co-pending applications: INDEX SERVER ARCHITECTURES IN TIERED AND SHARDED PHRASE POSTING LISTS, Ser. No. 11/694,780, filed Mar. 30, 2007; QUERY PHRASIFICATION, Ser. No. 11/694,845, filed Mar. 30, 2007; QUERY SCHEDULING USING HIERARCHICAL TIERS OF INDEX SERVERS, Ser. No. 11/694,802, filed Mar. 30, 2007; PHRASE EXTRACTION USING SUBPHRASE SCORING, Ser. No. 11/694,792, filed Mar. 30, 2007; and BIFURCATED DOCUMENT RELEVANCE SCORING, Ser. No. 11/694,797, filed Mar. 30, 2007, all of which are co-owned, and incorporated by reference herein.

FIELD OF THE INVENTION

The present invention relates to information retrieval systems for large scale document collections, such as the Internet.

BACKGROUND OF THE INVENTION

Information retrieval systems, generally called search engines, are now an essential tool for finding information in large scale, diverse, and growing information systems such as the Internet. Generally, search engines create an index that relates documents (or "pages") to the individual words present in each document. The index is typically stored as an inverted index, in which for each unique term in the corpus, there is stored a posting list identifying the documents that contain the word.

A document is retrieved in response to a query containing a number of query terms, typically based on having some number of query terms present in the document. Very generally, this is done by decomposing the query into its individual terms, and the accessing the respective posting lists of the individual terms. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion of a text of a document is presented to provide the user with a glimpse of the document's content.

Direct "Boolean" matching of query terms has well known limitations, and in particular does not identify documents that do not have the query terms, but have related words. For example, in a typical Boolean system, a search on "Australian Shepherds" would not return documents about other herding dogs such as Border Collies that do not have the exact query terms. Rather, such a system is likely to also retrieve and highly rank documents that are about Australia (and have nothing to do with dogs), and documents about "shepherds" generally.

The problem here is that conventional systems index documents are based on individual terms, rather than on concepts. Concepts are often expressed in phrases, such as "dark matter," "President of the United States," or idioms like "under the weather" or "dime a dozen". At best, some prior systems will index documents with respect to a predetermined and very limited set of 'known' phrases, which are typically selected by a human operator. Indexing of phrases is typically avoided because of the perceived computational and memory requirements to identify all possible phrases of say three, four, or five or more words. For example, on the assumption that any five words could constitute a phrase, and that a large corpus would have at least 200,000 unique terms, there would be approximately $3.2 \times 10^{26}$ possible phrases, clearly more than any existing system could store or otherwise programmatically manipulate. A further problem is that phrases continually enter and leave the lexicon in terms of their usage, much more frequently than new individual words are invented. New phrases are always being generated, from sources such technology, arts, world events, and law. Other phrases will decline in usage over time.

Some existing information retrieval systems attempt to provide retrieval of concepts by using co-occurrence patterns of individual words. In these systems a search on one word, such as "President" will also retrieve documents that have other words that frequently appear with "President", such as "White" and "House." While this approach may produce search results having documents that are conceptually related at the level of individual words, it does not typically capture topical relationships that inhere between co-occurring phrases themselves.

Another problem with existing individual term based indexing systems lies in the arrangement of the server computers used to access the index. In a conventional indexing system for large scale corpora like the Internet, the index comprises the posting lists for upwards of 200,000 unique terms. Each term posting list can have hundreds, thousands, and not infrequently, millions of documents. The index is typically divided amongst a large number of index servers, in which each index server will contain an index that includes all of the unique terms, and for each of these terms, some portion of the posting list. A typical indexing system like this may have upwards of 1,000 index servers in this arrangement.

When a given query with some number of terms is processed then in such an indexing system, it becomes necessary to access all of the index servers for each query. Thus, even a simple single word query requires each of the index servers (e.g., 1,000 servers) to determine whether it contains documents containing the word. Because all of the index servers must process the query, the overall query processing time is limited by the slowest index server.

SUMMARY OF THE INVENTION

An information retrieval system and methodology uses phrases to index and search documents in the document collection. Phrases are also used to decompose inputs (e.g., queries) into phrase trees, to schedule and optimize the execution of searches, to support the updating and maintenance of the indexes, and to support bifurcated relevance scoring of documents.

In one aspect, an information retrieval system includes an indexing system and index server architecture based on phrases. Phrases are extracted from a document collection in a manner that identifies real phrases as used in by language users, as opposed to mere combinations of words. Generally, this is done by collecting a large body of word sequences that are candidates phrases based on the structural features in the documents. Each candidate phrase is given a document phrase score for each document in which it appears, in a manner that reflects its likelihood of being a real phrase based on its position within a document, and the extent to which it occurs independently or jointly with other candidate phrases in the document. In addition, each candidate phrase is processed so as to identify any subphrases therein, which are similarly scored. Each candidate phrase's individual document phrase scores are then combined across the documents in which it appears to create a combined score. The document phrase scores and the combined score for a candidate phrase are evaluated to determine how strongly the document collection supports the usage of the candidate phrase as a real phrase. Generally, a candidate phrase is retained where it is strongly supported by at least one document; for example the maximum of its individual document phrase scores exceeds a predetermined threshold. A candidate phrase is also retained where it is moderately supported, as indicated by having a combined phrase score above a second predetermined threshold. This shows that the candidate phrase has a sufficient widespread use to be considered a real phrase. Finally, a candidate phrase is also retained where it is broadly supported, as indicated by the phrase receiving a minimum score from some number of documents. As an example, the system can include approximately 100,000 to 200,000 phrases, which will represent real phrases used in documents, rather than mere combinations of words.

Given a set of phrases (whether assembled in the foregoing manner or by other methods), the documents can be indexed by the phrase. For each phrase, a phrase posting list is maintained that identifies documents that are associated with the phrase; a document can be associated with a phrase by containing at least one occurrence of the phrase or an occurrence of a related phrase (e.g., a synonym, a subphrase, etc.). A given phrase posting list can have any number of documents, including millions of documents for extremely common phrases. These phrase posting lists are assigned for serving to plurality of index servers. The phrase posting list assignments are made so as to minimize the inter-server communications required for subsequent query processing. There are various embodiments of how the phrase posting lists can be assigned to the index servers, which have the following general structure.

One aspect of the indexing system is to divide each of the phrase posting lists into a number of partitions called "shards." Within a given phrase posting list there are identified the documents associated with the phrase. These documents are then assigned across some set of shards using a shard assignment function, which has the property that a given document is always assigned to the same shard, regardless of the phrase posting list in which it appears. Multiple shard assignment functions can be used, so that different shard assignment functions can be used with different phrase posting lists. The shard assignment function for a given phrase posting list is selected based on attributes of the phrase and its posting list. Each of the shards is then assigned to one of the index servers. The shard will be stored at the index server, either in memory or on disk or a combination of both. Typically each index server will store the shards for one or more than one phrase posting lists. In addition, a given shard may be stored in duplicate at a number of index servers, so as to provide increased query processing capability.

Another aspect of the storage arrangement for the phrase posting lists is the use of tiers. In this aspect, each phrase posting list is assigned to one of a number of tiers. The phrase posting lists in each tier will be stored in one or more index servers associated therewith. Thus, a number M of tiers are established, each tier associated with a set of index servers. For example, a system can be arranged with first, second and third tiers, though additional tiers can be used. Thus, all phrase posting lists assigned to the first tier are stored in the first tier index servers, and so on for the remaining tiers of index servers. Phrases are assigned to tiers using a phrase assignment function that represents the query processing costs for a given phrase posting list, and assigns phrases of similar cost to the same tier.

The use of shards can take advantage of the tiers of the index servers. In one embodiment, each tier is associated with a number of shards, which can be selected based on the performance demands and capacities of the index servers in the tier. A shard assignment function is then used for each tier to partition the phrase posting list assigned to the tier amongst the shards. As before, each shard is stored in one of the index servers associated with that tier. The shard assignment function is such that a given document is always assigned to the same shard. The relationship of the tiers to each other with respect to the number of shards therein can also be beneficially selected to further improve query processing. One way to do this is to associate each tier with a number of shards S, such that S for the $M^{th}$ tier is an integer multiple k of S for the $(M-1)^{st}$ tier. Thus, the number of shards increases from the first tier to the last tier. This partitioning of the phrase posting lists into shards ensures that any given index server need only communicate with a restricted set of index servers in the next tier in order to perform a query intersection. As a result, the overall time for query processing is significantly reduced. This is in contrast to conventional indexing systems which require any index server to be able to communicate with any other index server during query processing.

Another aspect of the information retrieval system is a method for maintaining and updating the index servers, so as to ensure generally continuous and availability of the index. In this aspect, the index is divided into a number of segments, which are independent of the tiers and shards. A segment may store the index information for any number of documents. The phrase posting lists in each segment can then be tiered, sharded and assigned to the index servers as described, so as to form segment shards. A given index shard is thus associated with the set of corresponding segment shards. For example, if there are twenty segments in the index, then a given index shard for group of phrase posting lists in a designated tier and shard is associated with the corresponding twenty segments shard for this same group, tier and shard of phrase posting lists. To update an index shard then, only the most recently updated segment shards need be merged into a copy of the index shard. This merging process can be handled by each index server for its respective shards, or by a separate set of merging servers. Once the index shards are merged, they are swapped in to replace the existing versions being served by the index servers. The swapping is done so that each index server remains available for query processing for most of the phrases it in the shards it stores, while the newly updated shards are being stored to index server.

Another aspect of the information retrieval system is a method of phrasification, which is identifying a set of phrases within any input text comprising a set of terms (and optionally operators), such as input search queries. An input text is accepted in the form of a Boolean tree of words and operators (either express or inferred). The tree is flattened to form a disjunction of conjuncts, where each conjunct contains a subset of words of the input. The words in each conjunct are then processed to generate a set of possible partitionings of the words into phrases. These partitionings are called "phrasifications." For example, the given the set for words "New" "York" "restaurants", the possible phrasifications are:

"New" "York" "restaurants";

"New York" and "restaurants";

"New" and "York restaurants"; and

"New York restaurants".

Each phrasification is scored using a scoring model that incorporates the expected probability of the phrase occurring in a document, the number of phrases in the phrasification, a confidence measure of each phrase, as well as adjustment parameters for controlling the precision and recall of searches on the phrases. Some number of highest scoring phrasifications are then selected as best representing the phrases in the input text.

Another aspect of the information retrieval system is a method of query scheduling the creates an schedule for executing a search of the phrases of a query so as to minimize query processing costs by the index servers, as well as to reduce inter-server communications. Generally, the input phrases are presented in a phrase tree that represents the logical structure of phrases in the query using a set of nodes for the phrases and operators. The phrase tree is processed with a set of scheduling rules that assign each phrase only to the index servers which serve the shard containing the phrase. Thus, instead of having every index server process a phrase, only the index servers that contain the document in their respective shards will do so. The scheduling rules also assign a query cost to the nodes that represents a cost for processing the nodes. These costs are then used to initially sequence the order of execution of the nodes in the phrase tree so as to reduce inter-machine communication. The scheduling rules also assign to each operator node in the query tree a set of index servers that will be responsible for evaluating it; these assignments are made so as to minimize the amount of inter-server communication.

Once the phrase tree is initially scheduled, it can be optimized further by analysis of the assigned costs at each node using some cost function. Particular nodes are identified in the phrase tree that can be transformed into their logical equivalents. A cost function is applied to the existing node and its logical equivalent, and the form having the lower cost is selected for inclusion in the optimized phrase tree. The cost functions can be based on the tier assignments of each phrase, the length of each phrase, or a cost of a subtree of the node. An optimized phrase tree is then used as a query schedule by the index servers. The scheduling and optimization, in conjunction with the tiers and sharding ensures that each index server will process only those portions of the phrase tree which can be affected by its phrase posting lists.

Another aspect of the information retrieval system is a method by which a query schedule is executed by the set of tiered and sharded index servers. The query schedule identifies for each node which index server the node is assigned to. A recursive descent through the phrase tree then is used, and at each node, the assigned index server determines whether any of the children node of the current node are also to be processed at the index server, or at another index server. Local children nodes—i.e., phrases that are stored at the index server—are processed to create a list of document. The index server then transmits this document list either back to the index server that called it, or to a next index server for further processing. Again, the index servers can use the shard information to ensure that these transmissions are optimized in length (smallest possible lists) and to only the index servers that can make use of the list.

In one embodiment of the information retrieval system, a bifurcated document relevance scoring model is provided. Here, the final document score for each document in the search results is based on two scoring functions. A first scoring function, a phrase relevance scoring function, is applied during document indexing. This function provides a score of the relevance of a given phrase to a given document, independently of any query or other phrases. A second scoring function is used during query processing. This second scoring function takes as input the phrase relevance scores for a set of documents, and the phrases of a query, and determines a final relevance score for each document. This bifurcated scoring model enables for improved query processing efficiency, as well as reduced storage requirements for the phrase posting lists.

The present invention has further embodiments in computer system and software architectures, computer program products and computer implemented methods, and computer generated user interfaces and search result contents.

The foregoing are just some of the features of an information retrieval system and methodology based on phrases. Those of skill in the art of information retrieval will appreciate the flexibility of generality of the phrase information allows for a large variety of uses and applications in indexing, searching, ranking, and other areas of document information processing.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

I. System Overview

Figure 1:
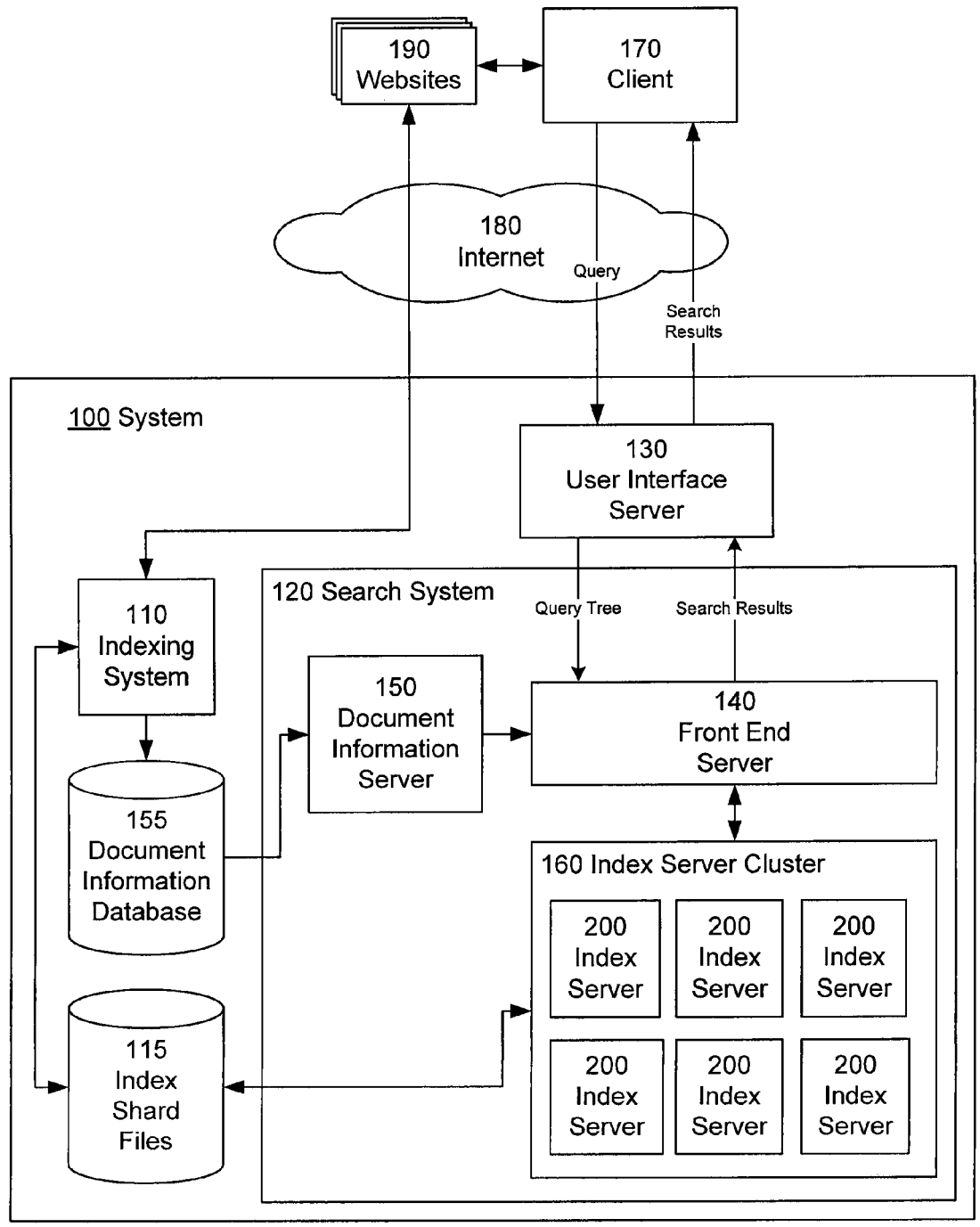
FIG. 1 is a block diagram of the software architecture of one embodiment of the present invention.

Referring now to FIG. 1, there is shown the software architecture of an information retrieval system 100 in accordance with one embodiment of present invention. This embodiment of the information retrieval system 100 includes an indexing system 110, a search system 120, a user interface server 130, a set of index shard files 115, and a document information database 155. The search system 120 includes a front end server 140, a document information server 150, and an index server cluster 160 comprising a plurality of index servers 200.

The indexing system 110 identifies phrases in documents, and indexes the documents according to their phrases, by accessing various websites 190 and other document collections over the network 180, and processing documents contained therein. The indexing system 110 maintains the index information in the index shard files 115. The indexing system 110 also updates the document information database 155 with content pertaining to indexed documents, including cached document versions, metadata, and related document information. The user interface server 130 receives a query from a client 170, and passes the query, in the form of a Boolean query word tree to the front end server 140. The client 170 can be a browser (for example to allow individual users to submit queries), or it can be any application program with programmatic access to an application programming interface exposed by the user interface server 130 (e.g., a separate server application that queries the system 100 for documents). Additionally, the front end server 140 can also expose an application programming interface that allows other applications to directly input properly formed queries.

The front end server 140 decomposes the query tree into a phrase tree that is optimized for execution by the index servers 200. The front end server 140 provides the optimized phrase tree to the search system 120. The search system 120 is responsible for managing execution of the search by the index servers 200. The index servers 200 process the phrase tree by accessing the index shard files 115, and returning search results comprising a set of documents relevant to the phrases of the query. The front end server 140 receives the search result set, and then ranks the documents in the search results, as well as accessing the document information server 150 to obtain document level information. The search system 120 provides the search results and associated document information to the user interface server 130. The user interface server 130 formats the search results, including creating the layout of the search results and associated document information, and other supplemental information or content (e.g., advertisements), and providing the formatted search results back to the client 170.

In the context of this system 100, "documents" are understood to be any type of media that can be indexed and retrieved by a search engine, including web documents, images, multimedia files (e.g., audio, video), text documents, PDFs or other image formatted files, and so forth. A document may have one or more pages, partitions, sections or other components, as appropriate to its content and type. Equivalently a document may be referred to as a "page," as commonly used to refer to documents on the Internet. No limitation as to the scope of the invention is implied by the use of the generic term "documents." The system 100 operates over a large corpus of documents, such as documents variously collected from across the Internet and World Wide Web, but can likewise be used in more limited collections, such as for the document collections of a library or a private enterprise. In either context, it will be appreciated that the documents are typically distributed across many different computer systems and sites. Without loss of generality then, a set of documents generally, regardless of format or location (e.g., which website or database) will be collectively referred to as a corpus or document collection. Each document has at least one associated identifier that uniquely identifies the document; these identifiers can be URLs, as well as document numbers, hashes, etc.

II. Indexing System

The indexing system 110 provides three primary functional operations: 1) identification of phrases 2) indexing of documents with respect to phrases, and 3) generation and maintenance of the phrase-based indices. Those of skill in the art will appreciate that the indexing system 110 will perform other functions as well in support of conventional indexing operations, and thus these other operations are not further described herein.

Figure 2:
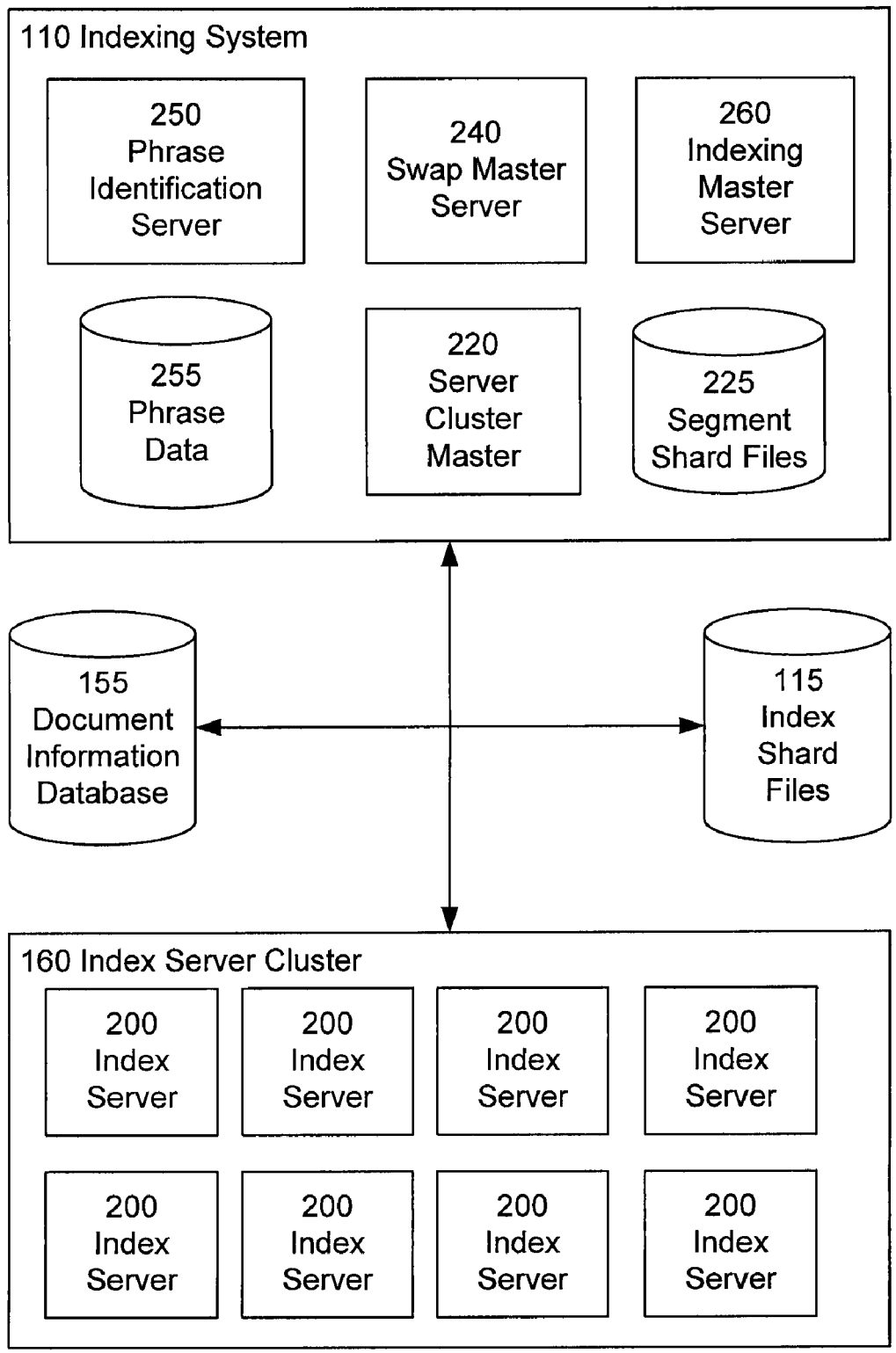
FIG. 2 is a block diagram of the indexing system.

Referring to FIG. 2, there is shown in the indexing system 110 in further detail for one embodiment. The indexing system 110 includes a server cluster master 220, a set of segment shard files 225, a swap master server 240, and a phrase identification server 250, and a database of phrase data 255. The indexing system 110 communicates with the index server cluster 160, the document information database 155, and the index shard files 115. The operations and responsibilities of the various servers will be further described below. Each of the various servers is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here.

1. Phrase Extraction

Figure 3:
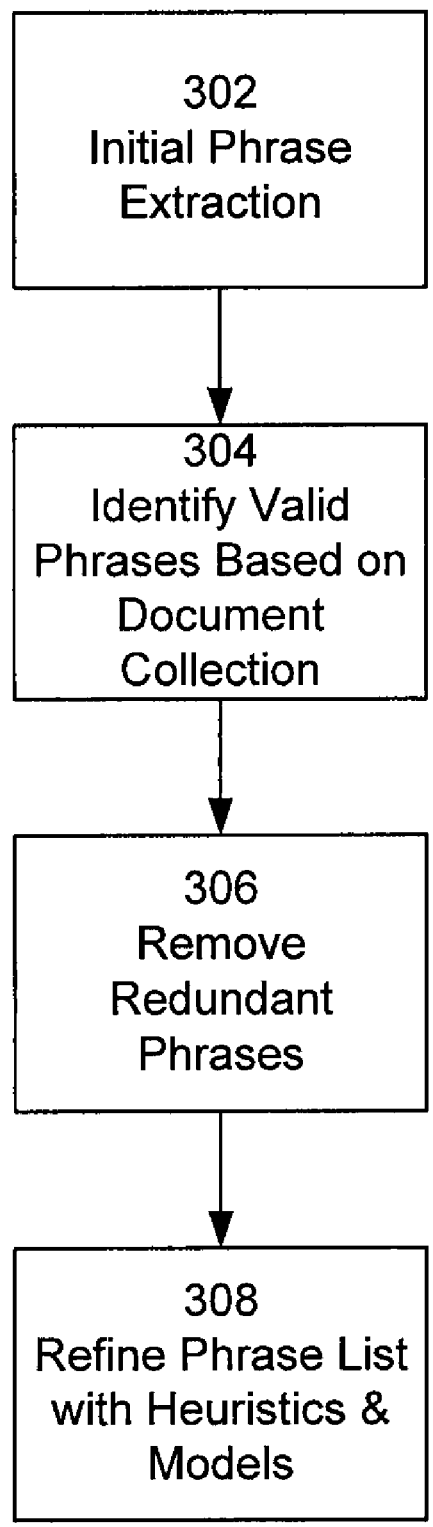
FIG. 3 is a flow diagram of a method for phrase extraction.

The first function of the indexing system 110 is to identify valid phrases for use in indexing documents; this process is called phrase extraction, since it seeks to extract valid (or "real") phrases from the document collection. This functionality is principally performed by the phrase identification server 250. FIG. 3 illustrates an overall flow diagram of the phrase extraction process. There are four basic stages the phrase identification process:

302: Extract initial set of candidate phrases;
304: Identify valid phrases based on document collection information;
306: Remove redundant phrases;
308: Refine the phrase list with heuristics.

Each of these stages will now be discussed in further detail.

(1) Initial Phrase Extraction

The phrase identification server 250 generates 302 an initial list of phrases by iterating over each document in a set of documents, identifying candidate phrases within each document, and then testing the collected candidates to determine the whether they are valid. The set of documents for this initial process can be the entire document collection, or a subset thereof, such as set of the most recently crawled documents; the number of documents is preferably on the order of 2 to 5 billion documents.

The phrase identification server 250 scans over each document's body and anchors, and maintains a buffer of the last N words of text encountered; N is preferably between 5 and 20 words. A "hit" is an event during this iteration over the documents where the phrase identification server 250 adds a candidate phrase instance to a phrase map table stored in the phrase data 255. A hit can arise when the buffer is full, or when the phrase identification server 250 identifies semantically bounded text sequences, here called "text breaks." A semantically bounded text sequence is identified by a semantic boundary marker that indicates that the next word to be read is semantically disjoint from the previous word or set of words in the buffer. These markers include, for example, a sentence boundary, a paragraph boundary, a positional boundary (such as the end of the title), a visible HTML element such as a table or horizontal rule, or a significant change in typeface (e.g., change in font style, size).

Whenever the phrase identification server 250 encounters a text break, or whenever the buffer contains N words, the phrase identification server 250 adds the contents of the buffer (forming a word sequence) to a phrase map table. If a text break is found, then the buffer is cleared; if the buffer is full, then the first word is dropped from the buffer, and the next word in the text is read in. If a hit is encountered that would result in a single word being written out as a text break, than that hit is ignored, and the phrase identification server 250 continues to the next word in the document.

The phrase map table maps each received word sequence to information about the visual position of the word sequence in the document, such as location within document, and the flag indicating position of the end of the word sequence relative to the start of the buffer, as well as typeface characteristics (such as font, size, and style), and length. The location can be indicated by section indicators (e.g. title, body, list, table) or word position. Hence, the phrase map table has the following logical structure:

Phrase Map Table: <word sequence, location, hit position, length, typeface>.

There are four possible values for the hit position: Initial, Final, Exact, Medial.

An Initial hit flag indicates that this particular sequence of N words was the first sequence of N words after the buffer was emptied.

A Final hit flag indicates that the text break was the last sequence of N words prior to an emptying.

An Exact hit flag indicates that the text break satisfies both of the above criteria.

A Medial hit flag indicates that the text break does not satisfy either of the above criteria.

Additional information can also be recorded for each word sequence such as linguistic markers (e.g., capitalization), or inclusion of the phrase as anchor text in a hyperlink. The order of the elements in the phrase map table is not limited to that shown above.

If there are multiple hits on the same sequence of words, the phrase identification server 250 keeps all of this information in the phrase map table. The phrase identification server 250 also may apply linguistic rules to the text break to further categorize it. For example, if a sequence of words appears to be a proper noun (such as a sequence of capitalized words in English text), that can be indicated in the phrase map table as well.

The following is an example of the buildup of the phrase map table for a simple HTML document:

<title> The quick brown fox </title>
The quick brown fox jumps over the lazy god.

Here, the phrase identification server 250 uses N=5. As the phrase identification server 250 scans through these words one at a time, the following occurs. An simple version of the phrase map table is included here, with only the word sequence, location, and hit position flags shown:

EXAMPLE 1

| Word Parsed | Buffer Contents | Phrase Map Table (Word sequence, location, position, length) | Comment |
| --- | --- | --- | --- |
| <title> | -empty- | | <title> indicates text break, but buffer is empty so no hit occurs. |

| Word Parsed | Buffer Contents | Phrase Map Table (Word sequence, location, position, length) | Comment |
| --- | --- | --- | --- |
| The | The | | |
| quick | The quick | | |
| brown | The quick brown | | |
| fox | The quick brown fox | | |
| </title> | -empty- | "The quick brown fox", title, "exact", 4 | </title> indicates text break. Buffer cleared. |
| The | The | | |
| quick | The quick | | |
| brown | The quick brown | | |
| fox | The quick brown fox | | |
| jumps | The quick brown fox jumps | "The quick brown fox jumps", body, initial, 5 | Buffer full. |
| over | quick brown fox jumps over | "quick brown fox jumps over", body, medial, 5 | Buffer full. |
| The | brown fox jumps over the | "brown fox jumps over the", body, medial, 5 | Buffer full |
| lazy | fox jumps over the lazy | "fox jumps over the lazy", body, medial, 5 | Buffer full |
| god | jumps over the lazy god | "jumps over the lazy god", body, medial, 5 | Buffer full. |
| . | -empty- | "over the lazy god", body, final, 4 | "." indicates text break. |

After processing the document, the phrase map table contains a set of word sequences, each a string with between two and N words, along with additional information about the word sequence.

For each word sequence, the phrase identification server 250 assigns a phrase score that indicates how good the word sequence is as a candidate phrase. The scoring of the word sequences can be done after each document is processed, after some set of documents is processed, or each time a word sequence is added to the phrase map table. The scoring function provides a scaled score (e.g., 0-100) that takes into consideration the location of each word sequence and its position, and optionally its typeface characteristics. In one embodiment, word sequences that are "exact" position hits are most highly scored, followed by "initial" hits, "medial hits", and then "final" hits. In an alternative embodiment, the initial, medial and final hits are given equal scores, and the exact hit is given a higher score. The score is also scaled by the location of the hit, with locations towards the start of the document (e.g., title) being more highly scaled. Typeface can also be used for scaling, including increasing the score for bold text, or a large font size. Use of the word sequence as a hyperlink anchor also increases its score; the upweight can be based on some measure of the quality of the linked page, such as its PageRank.

Generally then, the phrase identification server 250 identifies a word sequence as a good candidate phrase if its score is above an initial phrase identification threshold. This threshold may be a function of the number of words in the sequence, so that the threshold value is lower for longer sequences, since very meaningful long phrases occur more rarely than short ones. In general, the scoring function for the initial threshold is constructed so that even a single occurrence of a proper noun or text in a highly emphasized position like the title is enough to pass the initial threshold. If the hit had a score above the threshold, the word sequence is added to a candidate phrase table along with its score.

Next, the phrase identification server 250 determines whether or not subphrases of each candidate phrase are of interest as potential candidate phrases themselves. For instance, in the example above "The quick brown fox jumps" is not likely a candidate phrase, but "The quick brown fox" alone is—and the phrase identification server 250 does not discard the information that this sequence occurred in the body as well as the title.

More generally then, to identify subphrases that are potential candidate phrases, the phrase identification server 250 devolves the score of any candidate phrase "A B . . . C D" (with up to j=N words) by decomposing the candidate phrase into two child subphrases "A B . . . C" and "B . . . C D" (with j−1 words each), and scoring each of these subphrases. The scoring rules applied to these subphrases depend on whether the candidate phrase is a strong phrase, as described below. If j is 2, then the phrase identification server 250 skips this step.

The devolution rule is designed to avoid double counting, and so it depends on the position of the hits. First, the phrase identification server 250 compares the phrase's score to a second threshold, which is used to further identify strong phrases. If a candidate phrase has a score above the strong phrase threshold, it is determined to be likely to be a real phrase, and thus the phrase's score need not be further devolved to its subphrases. For example, if the phrase "new york giants" appears has a score above the strong phrase threshold, the phrase identification server 250 should be relatively certain that this was a phrase, and thus can avoid scoring occurrences of "new york" and "york giants" within the context "new york giants" as potential subphrases. The strong phrase threshold can be adjusted so that all candidate phrases are devolved (e.g., setting the strong phrase threshold to infinity) or it can be set low (even below the initial phrase threshold), to limit the subphrase analysis.

Accordingly, each candidate phrase is subdivided into two child phrases, and the phrase identification server 250 applies the following scoring rules to the child phrases, depending on the candidate phrase's score. First, if the candidate phrase's score is below the strong phrase threshold, the phrase identification server 250 applies the following rules for scoring the child phrases:

1. If the candidate phrase hit position was "exact" and had a score of X, the first child is indicated as an initial hit position with score X, and the second child is indicated as a final hit position with score X.
2. If the candidate phrase hit position was "initial" and had a score of X, the first child is indicated as an initial hit with score X, the second child is indicated as a medial hit position with score X/2.
3. If the candidate phrase hit position was "final" and had a score of X, the first child is indicated as a medial hit with score X/2, the second child is indicated as final hit with score X.
4. If the candidate phrase hit position was "medial" and had a score of X, both children are indicated as medial hits with a score X/2.

If the candidate phrase's score is equal to or above the strong phrase threshold, the phrase identification server 250 applies the following rules instead:

5. If the candidate phrase hit position was "exact" and had a score of X, then skip further scoring.
6. If the candidate phrase hit position was "initial" and had a score of X, the second child is indicated as a medial hit with score (−X/2)
7. If the candidate phrase hit position was "final" and had a score of X, the first child is indicated as a medial hit with score (−X/2)
8. If the candidate phrase hit position was "medial" and had a score of X, both children are indicated as medial hits with score (−X/2)

To further illustrate how the set of scoring rules is applied, the previous example is continued. Assume the initial scoring function applied to the word sequences scores 1 point for a body hit, and 2 points for a title hit; let both the initial phrase identification threshold and strong phrase thresholds be 3 points, so that all candidate phrases are tested for their subphrases. After processing the document text, the phrase map table can be considered as:

| Sequence | Data |
| --- | --- |
| "The quick brown fox jumps" | 1 occurrence, body text, initial, 5 words |
| "quick brown fox jumps over" | 1 occurrence, body text, medial, 5 words |
| "brown fox jumps over the" | 1 occurrence, body text, medial, 5 words |
| "fox jumps over the lazy" | 1 occurrence, body text, medial, 5 words |
| "jumps over the lazy god" | 1 occurrence, body text, final, 5 words |
| "The quick brown fox" | 1 occurrence, title text, exact, 4 words |

For the rest of this calculation, the phrase identification server 250 need only points and positions, so this can be rewritten as:

| Sequence | Initial Score |
| --- | --- |
| "The quick brown fox jumps" | 1 initial point |
| "quick brown fox jumps over" | 1 medial point |
| "brown fox jumps over the" | 1 medial point |
| "fox jumps over the lazy" | 1 medial point |
| "jumps over the lazy god" | 1 final point |
| "The quick brown fox" | 2 exact points |

"The quick brown fox jumps" does not exceed the initial or strong phrase thresholds, so the phrase identification server 250 decomposes it into its two children, "The quick brown fox" and "quick brown fox jumps", and scores them according to the rules (1)-(4), above. Note that its first child, "The quick brown fox", gets a score of 1, per rule (2) above, and is already in the table, so this additional score is added, as shown below. The second child gets added to the table with its score of 0.5, per rule (2), as well.

| Sequence | Revised Score |
| --- | --- |
| "quick brown fox jumps over" | 1 medial point |
| "brown fox jumps over the" | 1 medial point |
| "fox jumps over the lazy" | 1 medial point |
| "jumps over the lazy god" | 1 final point |
| "The quick brown fox" | 2 exact points, 1 initial point |
| "quick brown fox jumps" | 0.5 medial points |

When the phrase identification server 250 processes "quick brown fox jumps over," the same analysis results with its children "quick brown fox jumps" (which receives another 0.5) and "brown fox jumps over" (which is a new entry with 0.5):

| Sequence | Revised Score |
| --- | --- |
| "brown fox jumps over the" | 1 medial point |
| "fox jumps over the lazy" | 1 medial point |
| "jumps over the lazy god" | 1 final point |
| "The quick brown fox" | 2 exact points, 1 initial point |
| "quick brown fox jumps" | 1 medial point |
| "brown fox jumps over" | 0.5 medial points |

After the phrase identification server 250 is done with all of the 5-word phrases, the revised scores are:

| Sequence | Revised Score |
| --- | --- |
| "The quick brown fox" | 2 exact points, 1 initial point |
| "quick brown fox jumps" | 1 medial point |
| "brown fox jumps over" | 1 medial point |
| "fox jumps over the" | 1 medial point |
| "jumps over the lazy" | 1 medial point |
| "over the lazy god" | 1 final point |

The candidate phrase "The quick brown fox," has a total score of 3 and so the phrase identification server 250 outputs it, and devolves it according to rules (5) and (6): the exact points do not devolve, and the initial hit score results in a medial hit worth −0.5 points on "quick brown fox". Thus:

| Sequence | Revised Score |
| --- | --- |
| "quick brown fox jumps" | 1 medial point |
| "brown fox jumps over" | 1 medial point |
| "fox jumps over the" | 1 medial point |
| "jumps over the lazy" | 1 medial point |
| "over the lazy god" | 1 final point |
| "quick brown fox" | −0.5 medial points |

When the phrase identification server 250 processes "quick brown fox jumps", its first child's contribution is thus cancelled by the negative contribution: the only occurrence of "quick brown fox" occurred within a strong phrase. Thus:

| Sequence | Revised Score |
| --- | --- |
| "brown fox jumps over" | 1 medial point |
| "fox jumps over the" | 1 medial point |
| "jumps over the lazy" | 1 medial point |
| "over the lazy god" | 1 final point |
| "quick brown fox" | 0 points |
| "brown fox jumps" | 0.5 medial points |

The phrase identification server 250 continues through the rest of the phrases, devolving 4-word sequences into 3-word sequences, then into 2-word sequences. None of these subphrases will hit either threshold in this example. The output of stage 1 on this document is therefore a single candidate phrase: "The quick brown fox", 3 points. Of course, in practice a document will yield many candidate phrases.

The phrase identification server 250 repeats these steps for every document in the document set that is being used for phrase extraction. The result is an initial set of candidate phrases, and for each candidate phrase a list of document phrase scores, from the documents in which it was considered a reasonable candidate. The individual document phrase scores reflect how strongly each candidate phrase was used within each document. A candidate phrase that appears repeatedly, or in significant locations with the a document will have a high document phrase score for that document.

(2) Cross-Document Phrase Merging

The first stage 302 of the phrase extraction process provided information about how strongly various candidate phrases are indicated to be real phrases by individual documents. In the next stage 304, the overall support for each candidate phrase across the document collection is determined. For each candidate phrase, the phrase identification server 250 combines its document phrase scores into combined score to get a total measure of the support of the candidate phrase within the document collection. The combined score can be a sum, average, or other aggregate value of the individual document phrase scores.

Each candidate phrase is then evaluated to determine whether it is a real, valid phrase to be retained for indexing. This evaluation is based on the combined phrase score, as well as the set of document phrase scores for the candidate phrase. In general, the phrase identification server 250 applies a rule that a candidate phrase is retained where:

1. It is strongly supported by at least one document (e.g., the maximum of its individual document phrase scores is above a first threshold), or
2. It is moderately supported by a range of documents (e.g., the combined score is above a second threshold), or
3. It occurs very broadly (e.g., the number of documents from which it received a minimum score is above a third threshold).

Strong support is exemplarily shown by a phrase occurring in at least one document with a high document phrase score, as computed during the initial extraction stage, that exceeds a first threshold. Moderate support is exemplarily shown by the phrase having its combined document phrase scores being above a second threshold. Finally, broad support is exemplarily shown by the phrase occurring in a minimum number of documents having a minimum phrase score; the minimum required score can be set at a level to further control or limit the required breadth of support. These thresholds are selected based on the designer's desired level of liberal or conservative inclusion of candidate phrases, and will also depend on the characteristics of the document set in terms of the structure of the documents (e.g., length, formatting, etc.).

The output of this stage 304 is a further revised list of candidate phrases, which are initially deemed to be real and valid phrases, together with the combined score.

(3) Remove Redundant Phrases

A side-effect of the initial extraction stage 302 is that both a candidate phrase and its subphrases may be emitted from the same document, if the phrase scored between the initial threshold and the strong phrase threshold. This can be generally useful, because if the subphrase occurred independently of the longer phrase in some other documents, this document just gave further support (in stage 304) to the value of the subphrase. Accordingly, in this stage 306, the phrase identification server 250 processes the current candidate phrase list to identify a phrases that are subphrases another phrase and that have the same or almost the same composite score (e.g., the subphrase score should be at least 95% of the phrase score). In that case, these subphrases are determined to be redundant, and are eliminated from the candidate phrase list.

(4) Refine Phrase List with Heuristics and Language Models

The list of candidate phrases produced by stage 306 can be further refined with an optional processing stage using heuristics and/or language specific models. In one embodiment, a set of heuristics is created that represent knowledge of a fluent speaker. The heuristic rules eliminate candidate phrases that begin with certain words (e.g., "or", "and", etc) and other artifacts from the above screening process. Additionally, other refinement techniques may be applied, such as the use of generative language models to further analyze the documents and identify good or bad phrases, for example language specific models of grammar and syntax.

Once processed with the final refinement rules and models, the candidate phrase list is ready for use in indexing. This phrase list is updated to the phrase data 255. Each phrase is assigned a unique phrase numerical identifier; the phrase identifier can be a hash of the phrase, using SHA-1 or a similar hash function, to generate a unique value. The phrase data 255 there is then maintained in a phrase table that contains the phrase identifier, along with the phrase itself, sorted by the phrase identifier. This arrangement allows for very fast checking of a word sequence to determine if it is a known phrase. In addition, for each phrase, an expected probability of the phrase in the index is maintained and updated, based on the frequency of the phrase and the number of documents in the index.

As noted above, the document set used for phrase extraction can be any set of documents in the document collection. A further set documents that can be used for this process are the search query logs for the system 100, which comprise a large set of search queries. In this case, text breaks are indicated by syntactic objects in the query (e.g., quotation marks, Boolean operators such as AND, NOT, and OR, and similar operators) or other visual separations such as punctuation marks. The results of the extraction process on this document set can be combined with those of other document sets during the combination operation of stage 304; in that case, hits from query logs are assigned a lower weight in the combination algorithm than hits from documents.

In a typical embodiment of the phrase extraction process, anywhere from 1,000,000 to 10,000,000,000 phrases can be identified.

2. Indexing System with Tiers and Shards

The next functional operation of the indexing system 110 is to index documents in the collection using the phrase data 255, and store the index information in the segment shard files 225, from which the index servers 200 will be updated. This process of the indexing system 110 is managed by the indexing master server 260, which structures the index within the index server cluster 160 in such a way as to take advantage of the enhanced semantic information that is provided by the use of phrases to index the documents to both reduce the overall storage requirements for the index, as well as to structure this information to improve query processing times.

Generally, the indexing process has two basic stages:

1) Generating phrase posting lists for a set of documents; and

2) Assignment of phrases and documents to index servers.

In the first stage, the phrase posting lists are generated by the indexing server master 260 by processing a set of documents from the document collection, and in each document, identifying which phrases are related to the document. For each identified phrase, the posting list for the phrase is updated to indicate the document, and information about the significance of the phrase to the document. This significance information can include an information retrieval score for the phrase with respect to the document, as well as other information; the information retrieval scoring algorithm can be the same as that used during ranking of search results, or a different algorithm. In either case, the significance information is available to the search system 110 for use in ranking search results. This process is repeated across the document set for the indexing pass. Typically, an indexing pass can analyze between one and billions of documents, as desired by the system implementer.

This process can be implemented as follows, for a given document. The indexing server master 260 traverses the words of the document with a sliding phrase window of length n, where n is a maximum phrase length. The maximum phrase length is typically set to the length of the longest phrase in the phrase data 255. The length of the window will typically be at least 2, and preferably 4 or 5 terms (words). The indexing server master 260 checks each sequence of words (from length n to length 1) within the phrase window against the phrase data to determine if it is present as a known phrase. This is done by generating the hash of the word sequence, and checking it against the phrase table in the phrase data 255. The sequences that are considered as potential phrases include all subsequences of consecutive words within the window, multi-word sequences including one or more skipped words, and sequences including permutations (reorderings) of two or more words. Most generally, given the phrase window of length n, all n!(Sum(1/k!)) permutations, where the sum over k goes from 1 to n, are evaluated as potential phrases. A phrase window may be terminated by an end of line, a paragraph return, the end of the document, a markup tag, or other indicia of a change in content or format.

For each phrase that is identified within the document, the indexing server master 260 determines information about the significance of the phrase within the document. The indexing server master 260 can use various measures of significance, including maintaining a count of the frequency of occurrences of the phrase within the document, the position of the occurrences. The updated phrase posting lists are stored to the segment shard files 225, as will be further explained below, from which they will be copied to the index servers 200.

In one embodiment, this significance information for a given document and a phrase is an information retrieval score, generated by an information retrieval scoring algorithm, in which the phrase is used a "query" and the document by itself is used as the search corpus. This approach generates an information retrieval score of the relevance of the phrase to the document itself. The information retrieval scoring algorithm can be the same as or different from the one used by the search system 110 for final document scoring. Preferably, the information retrieval score generated during indexing is combined with information retrieval score generated during query processing that is based on a received query and some subset of the documents based on the query; the final score for each document is then a function of these two types of scores. One implementation of the scoring model is a bifurcated document relevance scoring model that uses two scoring functions, a first scoring algorithm (used at indexing time) that generates the phrase relevance score for a document, and a second scoring algorithm (used during query processing) that takes as input a set of phrase relevance scores (for phrases of the query) along with the query itself and optionally, and generates a final relevance score for a given document. In one embodiment of this approach, the posting list for each phrase is limited to include only the document identifier of the current document and the information retrieval score for the phrase with respect to the document; other significance information is not stored in the phrase posting list itself. This is beneficial to reduce the overall size and thereby memory requirements for the phrase posting list.

Once all of the documents in the indexing set have been processed, the next stage is the assignment of phrase posting lists to the index servers 200 for storage and serving. This is done by generally grouping the phrase posting lists into tiers and partitioning the phrase posting lists into shards, which are then stored in various index servers 200. This storage approach will be described by way of a systematic explanation of various embodiments, as follows.

Figure 4:
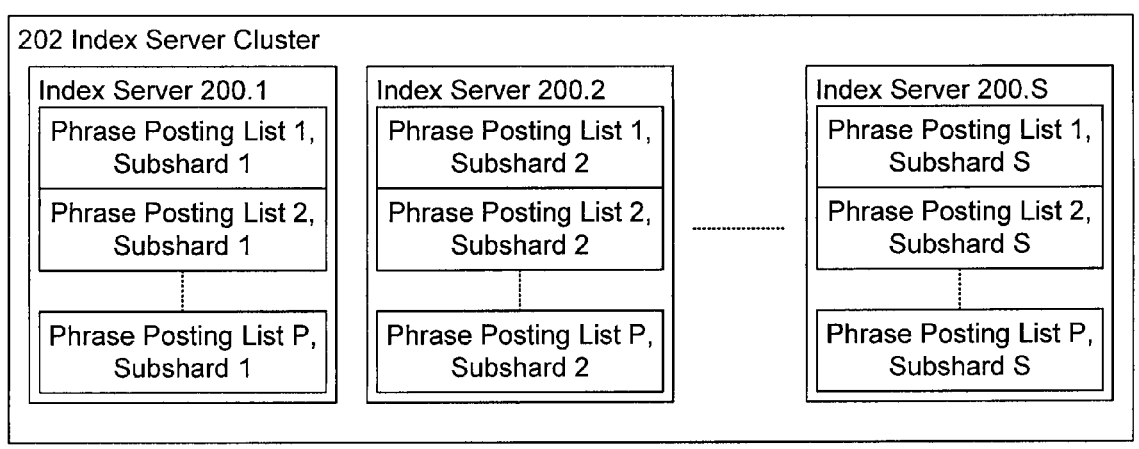
FIG. 4 is a block diagram of one embodiment of the storage architecture for the phrase posting lists in the index servers.

For the simplest embodiment of this storage process, the index server cluster 160 is logically structured as shown in FIG. 4. In FIG. 4 there is shown the index server cluster 160 with various index servers 200. For purposes of explanation, there are P phrases in the phrase data 255, and hence P phrase posting lists. Each phrase posting list includes a number of document identifiers therein.

In this first embodiment, each of the P phrase posting lists is partitioned into a number (S) of portions called "shards"; the partitioning process can be called "sharding." Each posting list shard will ultimately be stored by one (or more) of the index servers 160. For purposes of explanation, during indexing a posting list shard will be called a segment shard because it will be stored to the segment shard files 225; once an indexing pass is completed, the segment shard files are copied over to the index shard files 165 and form corresponding index shards (and thus the current index), and then copied to the index servers 200 for serving. An index shard may be stored by an index server 200 in memory, on disc, in a combination thereof. Thus, in FIG. 4, there is shown index server 200.1 through 200.S; for example, if S=1000, then there will be 1000 shards of each phrase posting list. Index server 200.1 stores the first shard, shard 1, for each of the phrase posting list, lists 1 through P; index server 200.2 stores shard 2 for all of the phrase posting lists, and so forth through index server 200.S, which stores the $S^{th}$ shard for all phrase posting lists. For clarity, it should be noted that an index server 200 operates as server program in a computer, and a given computer can support multiple index servers 200; thus a given server computer can store the phrase posting lists for multiple shards (i.e., shards $S_i$ for some set of values of i<=S). Additionally, a given shard (e.g. one containing high frequency phrases) may be duplicated and stored on multiple index servers 200 in order to increase performance.

The partitioning of the phrase posting lists into the shards is based on a document assignment function, which assigns documents within a phrase posting list to individual one of the shards, such that a given document is always assigned to the same shard (and hence index server 200) regardless of which phrase posting list the document appears in. For example, if a given document appears in the phrase posting lists of 50 different documents, it will still reside in the same shard by virtue of the shard assignment function. Within each shard, each of the phrase posting lists is then ordered by document identifier.

In one embodiment, the shard assignment function is a modulo function of the document identifier and S, the number of shards to be used:

Shard_ID=Document_Identifier(Mod $S$).

The shard assignment function is flexible in that the particular assignment operation can itself be a function of the phrase that is being sharded. In other words, instead of a single shard assignment function, multiple different shard assignment functions can be used, and the selection is based on the particular phrase whose posting list is being shared. More particularly, phrases that have very large posting lists (e.g., on the order of millions of documents) can be sharded into a large number of shards, whereas phrases with smaller posting lists (e.g., hundreds of documents), can be sharded with a smaller value of S. The selection of shard assignment function is then determined by document collection statistics, such as frequency or probability of the phrase.

The following simplified example illustrates the basic concept of sharding, using a single shard assignment function.

Assume the following phrase posting lists P1, P2, P3, and P4, each of which has some set of documents, indicated by document

| Phrase No. | Document IDs |   |   |   |   |   |   |   |   |   |   |   |   |   |   |
|---|---|---|---|---|---|---|---|---|---|---|---|---|---|---|---|
| P1 | 3 | 5 | 7 | 11 | 17 | 26 | 30 | 35 | 36 | 37 | 39 | 41 | 43 | 45 | 49 |
| P2 | 0 | 1 | 3 | 8 | 11 | 17 | 26 | 28 | 31 | 38 | 39 | 43 | 45 | 46 | 49 |
| P3 | 4 | 5 | 7 | 8 | 9 | 13 | 17 | 22 | 30 | 32 | 35 | 37 | 38 | 46 | 48 |
| P4 | 3 | 4 | 6 | 9 | 11 | 15 | 22 | 26 | 30 | 31 | 33 | 37 | 38 | 41 | 45 |

Further assume that there are 4 shards, S0 through S3. Then the modulo shard assignment function results in the following distribution of the phrase posting list documents to shards:

| P#, S# | Doc. Id | P#, S# | Doc. Id | P#, S# | Doc. Id | P#, S# | Doc. Id |
|---|---|---|---|---|---|---|---|
| P1, S0 | 36 | P1, S1 | 5, 17, 37, 41, 45, 49 | P1, S2 | 26, 30 | P1, S4 | 3, 7, 11, 35, 39, 43 |
| P2, S0 | 0, 8, 28 | P2, S1 | 1, 17, 45, 49 | P2, S2 | 26, 38, 46 | P2, S4 | 3, 11, 31, 39 43 |
| P3, S0 | 4, 8, 32, 48 | P3, S1 | 5, 9, 13, 17, 37 | P3, S2 | 22, 30, 38, 46 | P3, S4 | 7, 35 |
| P4, S0 | 4 | P4, S1 | 9, 33, 37, 41, 45 | P4, S2 | 6, 22, 26, 30, 38 | P4, S4 | 3, 11, 15, 31 |

In this table example, it can be readily seen that a given document is always assigned to the same shard. Each of these shards is then stored in one or more of the index servers 200. In this simple example, four index servers 200 would be used, one for each shard.

One benefit of sharding phrase posting lists is that it allows multiple different index servers 200 to operate in parallel during query processing, without requiring them to cross-communicate their query processing results. This benefit arises because the index servers that hold the different shards of a given phrase posting list can all operate concurrently to serve their document IDs to other index servers for query intersection, without having to wait on each other.

Figure 5:
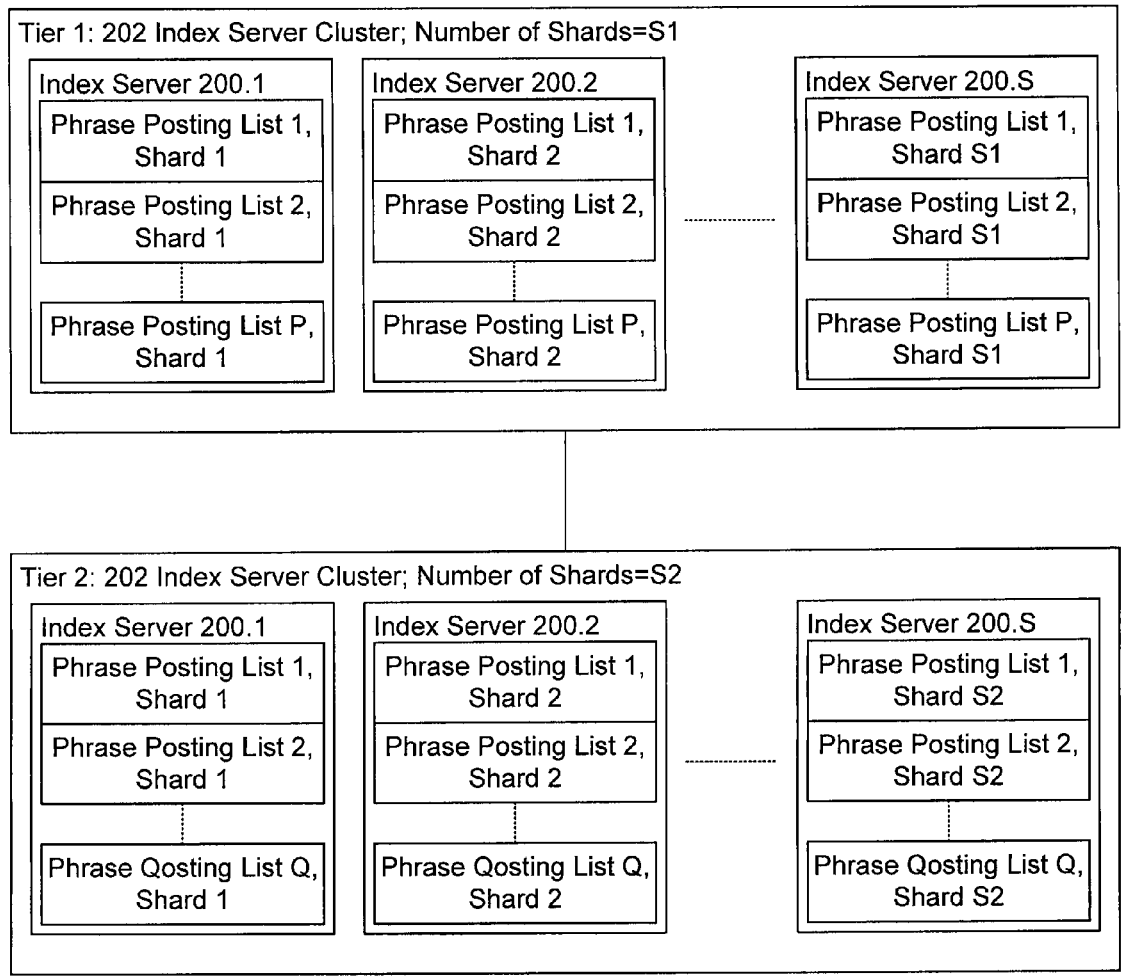
FIG. 5 is a block diagram of another embodiment of the storage architecture for the phrase posting lists in the index servers.

FIG. 5 illustrates a next embodiment, introducing the concept of tiers of index servers 200. A number of tiers is selected for a given implementation. In typical embodiments, there are between 2 and 10 tiers. Each phrase posting list is then assigned to one tier of index servers 200. The assignment of phrase posting lists to the tiers is based on a phrase assignment function, which will be further described below. It will be appreciated that the tiers are logical assignments of the index servers 200 that governs their functional roles, and not physical tiers in which the computers hosting the servers are located. Nonetheless, the tiers can be illustrated, as in the figures, as being separate from each other, which of course is not necessary in practice.

For example, in FIG. 5 there is shown two tiers, Tier 1 and Tier 2, each of which is associated with some set of index servers 200. The entirety of the phrase posting lists are divided amongst the two tiers, so that some phrase posting lists are assigned to the index servers 200 in Tier 1, and the remaining phrase posting lists are assigned to the index servers 200 in Tier 2.

Within each tier the phrase posting lists therein are divided into the shards as described above with respect to FIG. 4. The number of shards in each tier is variable; as shown in FIG. 5, there are S1 shards in Tier 1 and S2 shards in Tier 2. In one embodiment, the number of shards in tier n is an integer multiple of the number of shards in tier n−1:

$$S_n = kS_{n-1}$$

where $S_n$ is the number of shard in tier n, and k is an integer. This relationship between the number of shards in the tiers is beneficial during query processing time because it constrains a given index server 200 in tier n to communicate with at most k index servers in tier n+1 during query processing, rather than all of the index servers in tier n+1. Each index server 200 knows the number of shards (and hence index servers 200) in the next tier, and thus can readily determine via the shard assignment function which index servers 200 in that next tier are to receive its shard during query processing.

Figure 6:
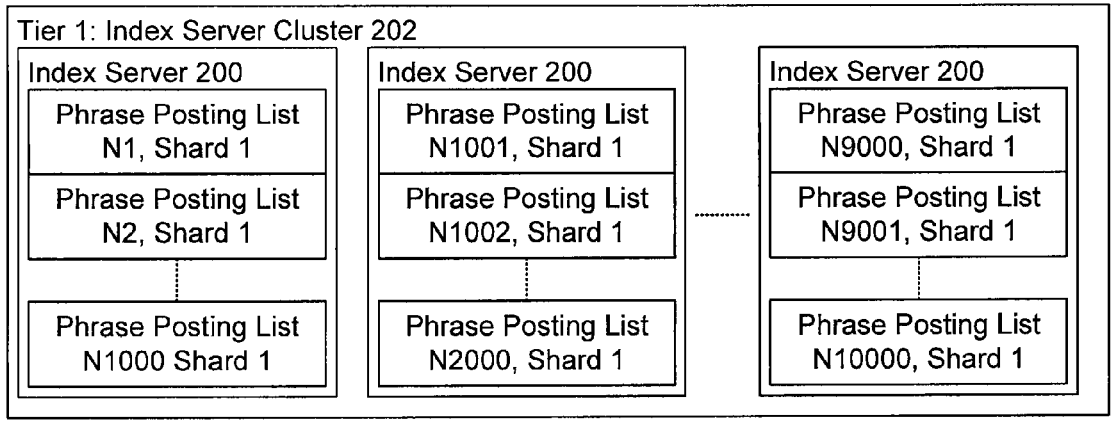
FIG. 6 is a block diagram of yet another embodiment of the storage architecture for the phrase posting lists in the index servers.
Figure 6:
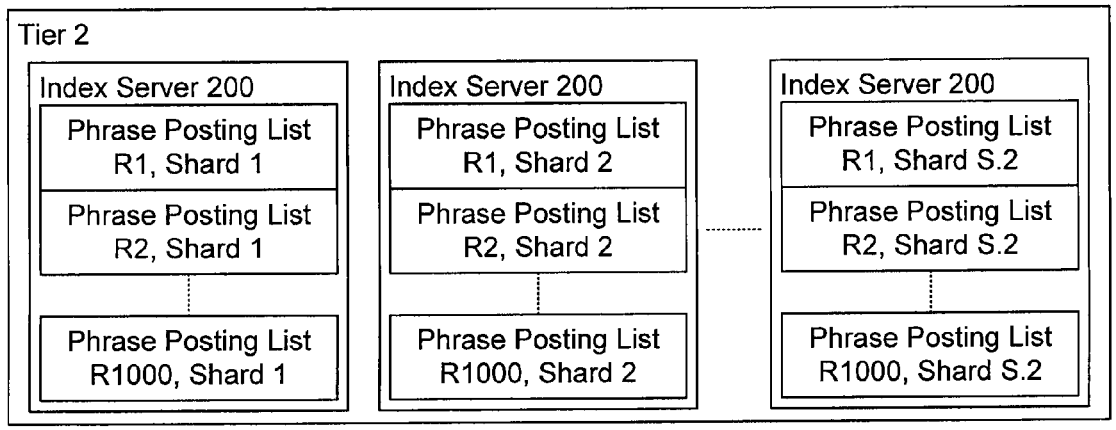
Figure 6:
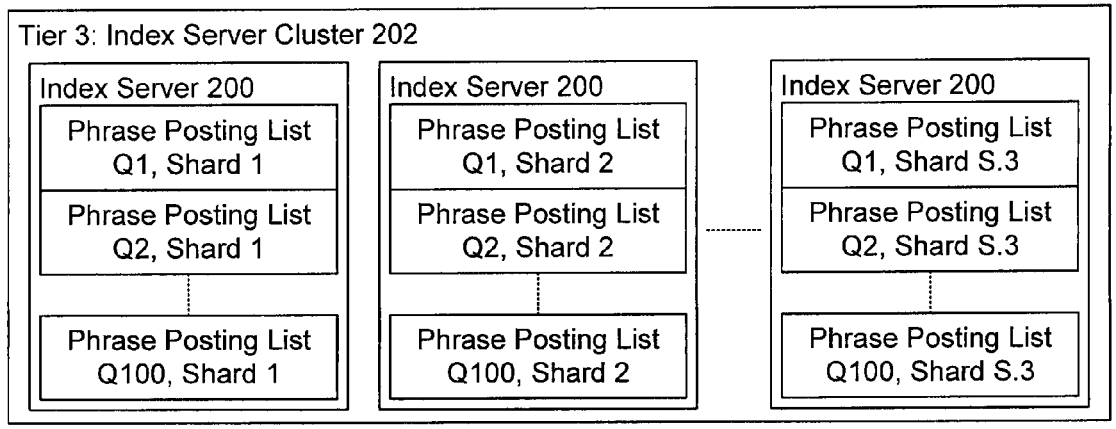

FIG. 6 shows an example of a three tier embodiment, here using three tiers, Tier 1, Tier 2, and Tier 3. Tier 1 stores a set of 10,000 phrase posting lists, each of which has one shard. These 10,000 phrase posting lists are distributed across a selected number of index servers 200, which can be for example, 10 index servers 200, each storing approximately 1,000 phrase posting lists (the illustration of 1,000 phrase posting lists per index server 200 in FIG. 6 is merely illustrative, in practice the actual number of phrase posting lists per index server 200 will vary). Tier 2 stores 1,000 phrase posting lists, each of which is partitioned into 10 shards. Here, in this tier each index server 200 stores the entirety of a shard for its assigned phrase posting lists. Note as well that the number of shards here is an integer multiple of the number of shards in tier 1. Finally, tier 3 stores 100 phrase posting lists, but across 1,000 shards. Again, the number of shards in this tier is an integer multiple of the number of shards in the previous tier.

The assignment of phrases to tiers can be implemented in various ways. In one embodiment, the assignment of phrases to tiers is as follows. First, a query processing cost measure is selected which represents some cost for the index servers 200 when processing queries against a phrase posting list. The cost measure may be a direct measure of processing time, communication times or bandwidth, memory requirements, or the like. The cost measure may also be an indirect measure, based on attributes of the phrase posting lists, such as the length the phrase posting list in terms of number of documents, number of bytes, or other factors. A phrase assignment function assigns a phrase to a tier using attributes of the phrase posting list, such as its length, and the capacities of the available index servers (e.g., their available memory, processing speed, and the like). For example, phrase posting lists that will have high processing costs can be assigned to tiers having the higher performance index servers (e.g., faster, more memory, etc.). This arrangement is beneficial since during query processing, the phrases in the query can be selectively processed only by those index servers 200 in the tiers that contain the phrase posting lists for those phrases. A phrase assignment map is maintained identifying for each phrase to which tier, shards, and index servers 200 within the tier the phrase is assigned, along with additional information about the phrase, such as its frequency in the document collection, ranking information for computing a ranking score, or the like.

In one embodiment, the phrase posting lists are assigned to the tiers by associating each tier with a minimum cost (in terms of the above cost measure), and then assigning a phrase posting list to the tier for which the cost of the phrase posting list is greater than the minimum cost for that tier, but less than the minimum cost for the next tier. Once a phrase posting list is assigned to a tier, it is stored in one or more the index servers 200 in the tier, as illustrated in FIGS. 4-6.

One particular embodiment of the cost measure is the length of the phrase posting list. This is used as an indirect measure of query processing costs, as larger phrase posting lists require a greater number of index servers 200, and hence an increased amount of potential inter-server communication during query processing. Each tier then is associated with a minimum phrase posting list length L, such that L is zero for the first tier, and L for each $M^{th}$ tier (M>1) is greater than L for the $(M-1)^{st}$ tier. The length of a posting length can be the number of documents therein, number of bytes, or other measures. Each phrase posting list is assigned to a tier based on its length, by assigning each phrase posting list to the tier in which its length will "fit" between the minimum length of that tier and the minimum length of the next tier. The index servers 200 in each tier store the phrase posting lists assigned to that tier.

In one embodiment, index servers 200 in the first tier can be used to store phrase posting lists for relatively low frequency phrases; these will generally (though not necessarily) be relatively longer phrases, such as "Harry Potter and the Order of the Phoenix", or rather obscure word combinations, such as "psychedelic popsicles". Typically, are a large number of such phrases, but each has a rather short phrase posting list (e.g., on the order of <1,000 documents). Accordingly, appropriate thresholds can be assigned to tiers 1 and 2 (e.g., 0 for tier 1, and 1,000 for tier 2), and all phrase posting lists with less than 1,000 documents therein are assigned to tier 1. Since each phrase posting list is short, it can be stored in a single shard that is not further partitioned. Index servers in next tier(s), can store progressively longer phrase posting lists, using the appropriate limits on the tiers and the phrase assignment function. The last tier, i.e., the $M^{th}$ tier, can be used to store the phrase posting lists for very high frequency phrases. In a typical document collection there will a relatively small number of these, but each will have a phrase posting list on the order of millions of documents. Here then a large number of shards is used to partition the phrase posting lists.

From the foregoing, the use of tiers and shards can be now explained more generally. The phrase posting lists may be considered to be an array of rows and columns. Each row corresponds to a single phrase posting list, and column corresponds to an $i^{th}$ document in the list. Tiers then are understood to group the rows together (though not necessarily in any particular order within each group); this can be considered a "horizontal" grouping. Shards by contrast can be understood as "vertical" partitions, since they divide up each row into a number of portions. Several insights can be gained from this analysis. First, the grouping by tiers and the partitioning by shards can be independently controlled, or one can be made dependent on the other, as shown above. Second, this independent control can be exercised to a very granular degree, so that each phrase posting list can be very selectively assigned to a tier and a number of shards. Third, the types of assignment functions for the tiers and shards can be selected to optimize different performance characteristics of the index servers 200. Thus, the phrase assignment function can be used to optimize for one aspect of performance, say communications costs, and the shard assignment function can be used to optimize for a different aspect of performance, such as increased parallelism amongst the index servers.

3. Index Maintenance

The foregoing section described the processes and structures by which the phrase-based index is created. Further aspects of the present invention are the processes and structures used to maintain and update the index over time. Referring again to FIG. 2, the indexing server master 260, server cluster master 220, swap master server 240, index shard files 115, and segment shard files 225 are the components principally involved in updating the index.

As described above, the index for the document collection is divided into a number of tiers and shards, which are then served by the various index servers 200. To facilitate updating the index an additional organizational structure is used, called a segment. The set of all documents in the index is divided into a number of segments; the segments are independent of the tiers and shards described above. Each document is typically represented in only one of the segments, though in some instances a document may appear in multiple segments. For example, if the document is an important document that should be indexed frequently, then this document can be placed into multiple segments. In this case, the document may be assigned a different document identifier for each instance, and when the document is retrieved in search results, only the most recent instance of the document will be returned. A given segment will contain documents that are indexed in various phrase posting lists across the tiers and shards. Typically a segment will store the information for 1M to 10 B documents. A typical implementation will have between 10 and 1000 segments, depending on the number of documents in the document collection.

As described above, the indexing server master 260 creates the index by processing a set of documents from the document collection, and in each document, identifying which phrases are related to the document. More particularly then, indexing server master 260 performs this processing on each of the segments, creating a segment phrase index of phrase posting lists for the documents in the segment. This segment phrase index is then tiered and sharded as described above to form segment-based shards, or more simply the segment shard files 225, as mentioned referenced above. Each segment shard file is stored under the management of the server cluster master 220. The server cluster master 220 maintains an index specification, which identifies for each segment shard file, version information (e.g., version number, date of last update), location information identifying the machine and director(ies) storing the segment shard file, and the corresponding index shard file to which the segment shard file is associated. Additional update data optionally may be included that more granularly specifies the differences between the current segment version and the previous version in terms of which phrase posting lists in the shard were updated.

To complete the update of the index servers 200, the segment shard files 225 from various segments are combined into the index shard files 115 which are served from the index servers 200. To do this, the index specifications for all segments are read by the server cluster master 220, and locations of the segment shard files corresponding to the most recent versions of each segment are determined. Next, the segment shard files for each index shard file are combined.

Figure 7:
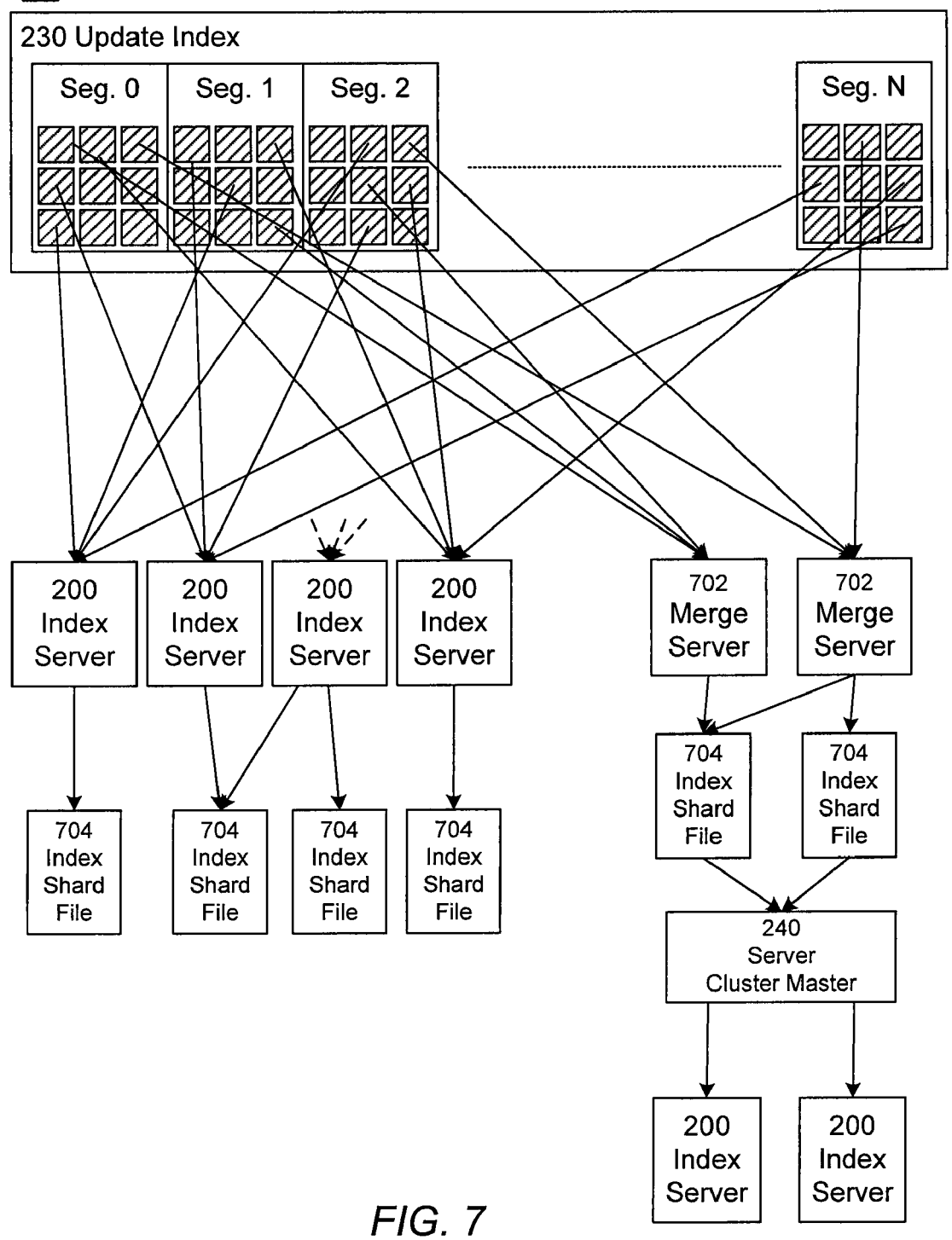
FIG. 7 is an illustration of the merging of segment shard files into index shard files.

FIG. 7 conceptually illustrates the various embodiments by which the segment shard files are merged into index shard files. In one embodiment, this is done by a separate set of merging servers 702, which read, for each index shard file 704, the corresponding segment shard files into memory, combine each phrase posting list therein to form a merged phrase posting list, and write the resulting merged list as an index shard file 704 back to the server cluster master 220, which stores them in the update index 230. The individual index servers 200 then copy the new index shard files from the update index 230 into their own memory/disk. In an alternative embodiment also illustrated in FIG. 7, the index servers 200 themselves perform the combining operation, reading the segment shard files from the update index 230 into their own memory, and doing the merge operation locally. The advantage of the latter embodiment is that the additional work of copying the merged index shard files (which are larger than the segment shard files) from the update index 230 to the index servers 200 is not needed, but the disadvantage is that additional work must be performed by the index servers 200. The selection of which approach to use can be made as part of system design, or even at run time, so that index servers 200 that are lightly loaded are tasked with their local merges, whereas for heavily loaded index servers 200, the merging servers are used.

The swap master server 240 directs the merging process in which the merges are performed by the individual index servers 200. The swap master server 240 is notified each time a segment update is stored to the server cluster master 220. For each such update, the swap master server 240 determines from the index specification which index shard files 115 need to be updated on the index servers 200, based on the version information for the segment shards 225. The index specification is used then to determine which index servers 200 are associated with these index shards. This set of index servers 200 then forms the current update group.

The swap master server 240 instructs the index servers 200 in the update group to begin the merge process. This process is typically done during a window of low load activity, such as late at night. The swap master server 240 provides each index server 200 in the update group with information identifying where the segment shard files 225 for its update are held (which machine and directory). Each index server 200 is responsible to retrieve the updated segment shard files 225, merge these with the phrase posting lists in the existing current index shards, and notify the swap master server 240 upon completion. As noted above, the a separate set of merge servers can perform the merging operation directly on the server cluster master 220, in which case they are controlled by the swap master server 240 in the manner just described. Additionally, the merge servers can be used in this fashion when creating an index from scratch, otherwise using the index servers 200 during regular updates.

After all of the phrase posting lists have been merged relative to the updated segment, the swap master server 240 then notifies each of the index servers 200 to swap its currently served index shards (in memory or disk) with the updated and merged index shard files 115. Each index server 200 manages the swap process as follows. For shards that are served by multiple index servers 200, the swap master server 240 instructs the index servers 200 corresponding to multiple copies of each index shard file to swap at different times, so that at any given time a minimum number of copies of each index shard file are available for query serving from index servers 200 that are not swapping. This is done so that the index servers 200 can continue to service queries for documents in the phrase posting lists of the older shards. For index shards which are served by only one index server 200, the swap master server 240 instructs the index servers 200 to swap index shard files corresponding to different shards of a single posting list gradually, so that at any given time no more than a small percentage of shards, e.g. 5%, of each such phrase posting list are in the process of swapping. Preferably, phrase posting lists served by single index server 200 are divided into enough shards that a single shard contains no more than this desired percentage of phrases or documents therein. As a result, during the write passes only a very small portion of the overall document index will not be served, thus having little impact on the overall search results.

III. Search Query Processing

Figure 8:
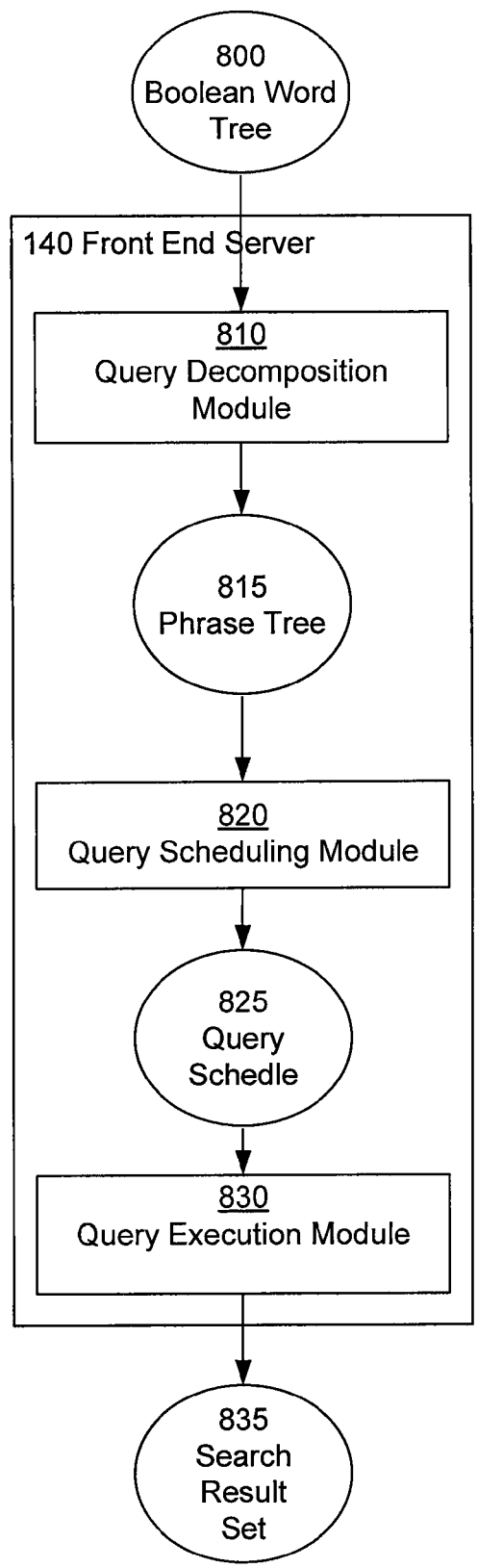
FIG. 8 is an illustration of the query phrasification, scheduling and execution processes in the front end server.

As described above with respect to FIG. 1, the front end server 140 receives a query from the user interface server 130, and in cooperation with the search system 110 creates a set of search results to be provided to the user interface server 130. FIG. 8 illustrates the overall data and process flow for the processing of search queries as handled by the front end server 140. Generally, the process takes as input a Boolean word tree 801 from the user interface server 130, wherein the leaf nodes include individual words from the query and the non-leaf nodes contain Boolean operators AND, OR, or NOT. The Boolean word tree may also include, for any of the query words (or groups thereof), additional nodes that are synonyms and related words, as derived from any external synonym source (e.g., any source from simple thesaurus tables to concept-based analysis algorithms), in which case a node may include an annotation that indicates whether it is part of the original query or derived from a synonym source. The query phrasification module 810 is responsible for decomposing a query tree into a phrase tree 815 comprising a set of phrases and the semantics of the query. The query scheduling module 820 then optimizes phrase tree into a query schedule 825 by which this phrase tree is executed. The query execution module 830 then manages the execution of the query schedule by the index servers 200. The index servers 200 create a set of results (documents) which are returned to the front end server 140, which in turns creates a final search result set 835 and provides it to the user interface server 130. The following sections describe these stages of operation in detail.

1. Query Phrasification

Figure 9:
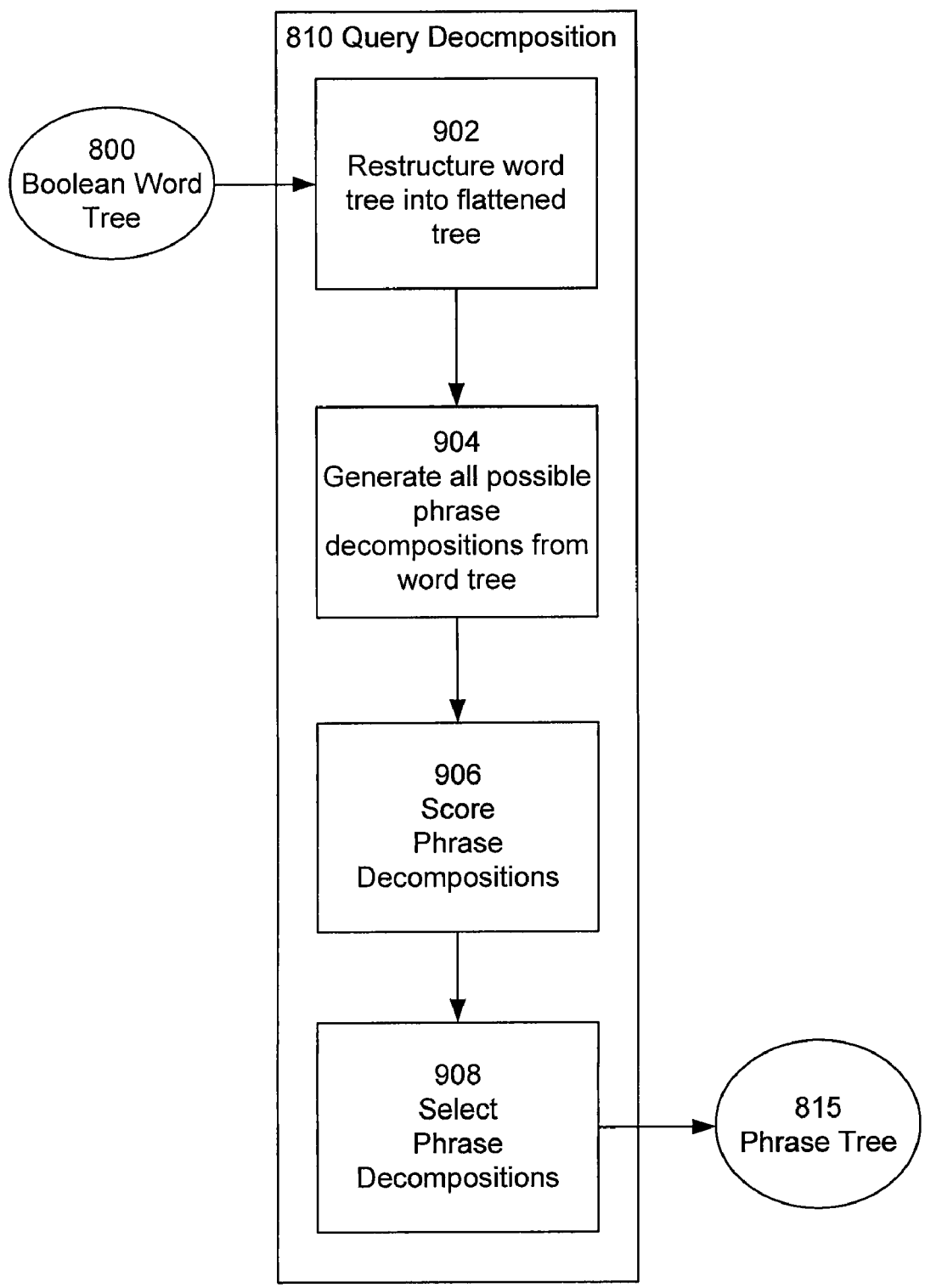
FIG. 9 is an illustration of the query phrasification process.

FIG. 9 illustrates the process flow of the query phrasification module 810 according to one embodiment. Other embodiments can have different and/or additional stages than the ones shown in the figure. The query phrasification module 810 takes as input the Boolean word tree 800; this Boolean word tree can be of any complexity, including any number of conjuncts and disjuncts, including nested groups. The query phrasification module 810 generates as output a Boolean phrase tree, wherein the leaf nodes contain one or more phrasification (each containing one or more phrases) resulting from the phrasification and the non-leaf nodes contain the Boolean operators AND, OR and NOT. It should be noted that the query phrasification process is not limited to use with search queries as inputs, but can be applied in many other different applications to any input comprising a set of words and (optionally) operators; for example the query phrasification process can be applied in any type of natural language processing, text mining, document analysis, including routing, description generation, categorization, concept matching and extraction, and so forth. The stages of phrasification are as follows.

The query phrasification module 810 receives from the user interface server 130 the Boolean word tree 800. The query phrasification module 810 restructures 902 the word tree using de Morgan's laws into an equivalent tree comprising a single top level OR node, each of the disjuncts being an AND of a number of leaf nodes and/or NOTs of leaf nodes. This process can be described as flattening the tree. For example, the word tree:

(A OR B) AND (C OR D)

is restructured to:

(A AND C) OR (A AND D) OR (B AND C) OR (B AND D)

where A, B, C, and D are nodes of the word tree. As can be appreciated, each of these nodes could as well be complex nodes as well, with further child nodes, which are in likewise restructured.

The query phrasification module 810 then generates all possible phrasification from the restructured word tree. This is done by taking each subtree—which is itself a disjunct of the top-level OR—of the form (A AND B AND C . . . M) and creating all possible partitions of the conjuncts A, B, C . . . M into disjoint phrases. For example, the subtree:

(A AND B AND C AND D)

generates the following phrases phrasifications, where each group of terms in quotes is a phrase:

"A B C D"
"A" AND "B C D"
"A B" AND "C D"
"A B C" AND "D"
"A" AND "B" AND "CD"
"A" AND "B C" AND "D"
"A B" AND "C" AND "D"
"A" AND "B" AND "C" AND "D"

A more concrete example is "New York Ethiopian restaurants", which yields the following phrasification:

"New York Ethiopian restaurants"
"New" AND "York Ethiopian restaurants"
"New York" AND "Ethiopian restaurants"
"New York Ethiopian" AND "restaurants"
"New" AND "York" AND "Ethiopian restaurants"
"New" AND "York Ethiopian" AND "restaurants"
"New York" AND "Ethiopian" AND "restaurants"
"New" AND "York" AND "Ethiopian" AND "restaurants"

The possible phrasification can be extended to include all permutations of the order of the conjuncts as well (e.g., phrasification where the sequence of A, B, C . . . is altered).

If there are NOTs in the query, these are treated treat those as being hard boundaries for the purpose of phrasification. For example, if the query is:

(A AND B AND NOT C AND NOT D AND E AND F)

then no phrasification are generated that cross the B/C, C/D, or D/E boundaries, so that only "A B" vs. "A" "B" and "E F" vs "E" "F" are considered as potential nodes. This method may be extended by adding other such boundary points within the query, based on annotations in the original Boolean query of words. For example, if the user typed explicit quotes in the query:

"New York" fast food then no phrases would be derived from "York fast".

Next, the query phrasification module 810 scores 906 each phrase phrasification, using the expected probability of each phrase in the phrasification, as obtained from the phrase data 255. In some cases, the probability for a phrase is zero since it is not contained in the phrase data, and hence is not a real phrase. For example, the phrase "York Ethiopian" is itself not a phrase, and its frequency would be zero.

The query phrasification module 810 then scores each phrase phrasification using a phrase scoring function. The phrase scoring function is designed to trade off precision versus recall in terms of selecting a final set of phrases. The general model for a phrase scoring function is as follow:

$$S = f(N) \prod_{i=1}^{N} P(p_i) \cdot C(p_i)$$

where,

S=score for a particular phrase phrasification;

N=number of phrases in the phrase phrasification;

$p_i$=phrases in the phrase phrasification where i ranges from 1 to N;

$P(p_i)$=probability of phrase$_i$, which can be an estimated probability or derived from the number of documents in the corpus that contain phrase$_i$ divided by total number of documents in the corpus;

$C(p_i)$=confidence in the phrase$_i$ where C is 1 for phrases that were in the original input and C<1 for phrases that are derived from other sources, such as synonym sources that can provide a scaled measure of the confidence of the phrase; and $f(N)$=function of N that adjusts the bias between precision and recall.

In one embodiment, the function (N) that adjusts the bias between precision and recall is defined as, $$f(N) = (\beta^N / N^{1+\alpha}),$$

where $\alpha$=an adjustable constant such that $\alpha > 0$ to adjust precision of phrase phrasification (higher $\alpha$ increases the precision and reduces the recall), and $\beta$=an adjustable constant such that $0 < \beta < 1$ to adjust the bias against obtaining too many phrases (smaller $\beta$ reduces the recall)

The $\alpha$ and $\beta$ parameters are adjusted by the system designer to trade off the precision and recall of the resulting search for the phrase phrasification.

Once the phrasification are scored, the query phrasification module 810 selects some subset of the highest scoring phrasification. The subset of selected phrasification can vary from one (i.e., highest scoring phrase phrasification) to some fixed number (e.g., top 10 scoring phrasification), or a selected percentage (50%) of the top scoring phrasification. In addition, the size of the subset can be varied based on other system variables, such as system load, or input context (e.g. source of the query).

The selected phrasification are organized as a Boolean phrase tree 815 having a root OR node, with each of the selected phrasification being a disjunct of the root node.

2. Query Scheduling & Query Optimization

Figure 10:
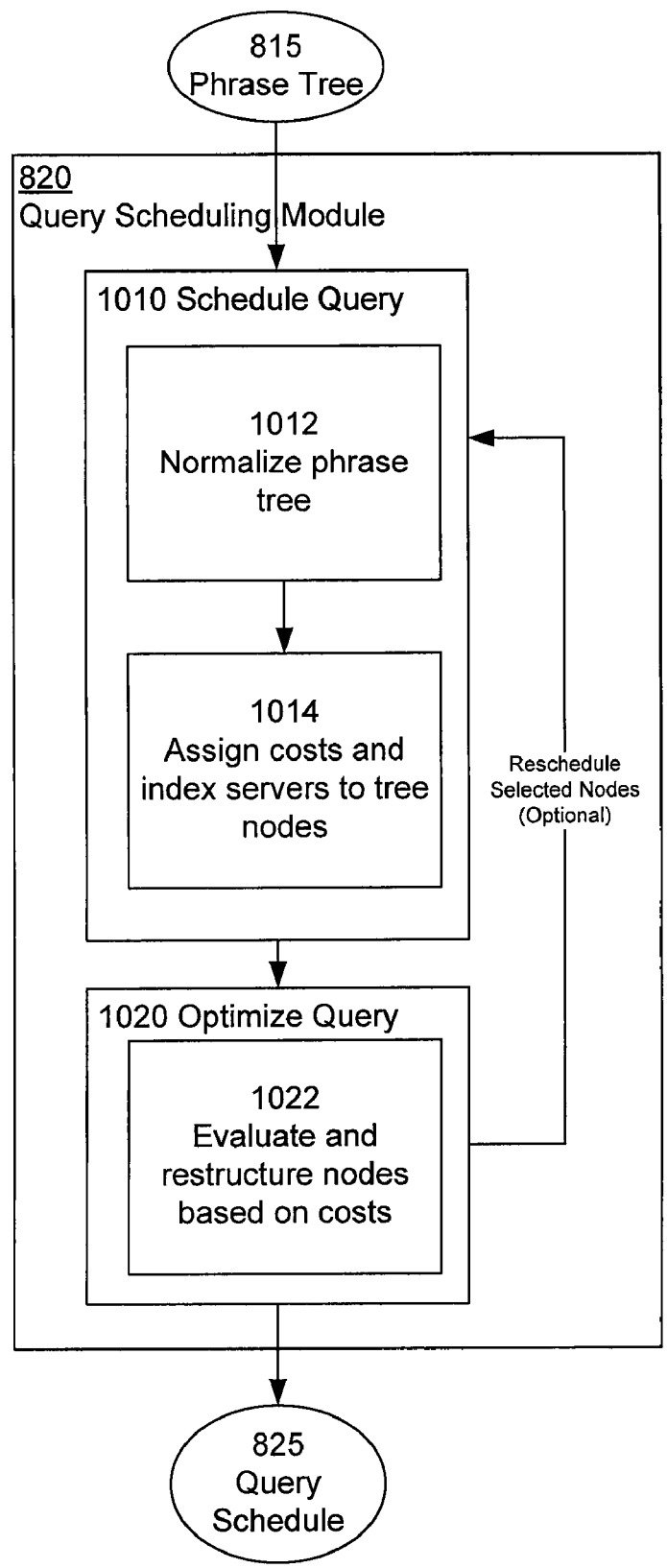
FIG. 10 is an illustration of the query scheduling process.

FIG. 10 illustrates the stages for query scheduling 1010 and query optimization 1020 handled by the query scheduling module 820, after query phrasification and prior to query execution. The input to the query scheduling module 820 is the Boolean phrase tree 815 previously described; the output is the query schedule 825 that sequences the phrases in the phrase tree for execution and identifies which index servers 200 are to be used for the execution operation. The query schedule 825 can be stored as a Boolean schedule tree which is semantically equivalent to the original tree, and each of whose nodes is additionally annotated to identify the set of servers on which it should be executed. The query schedule can likewise be stored in equivalent structures so long as the underlying semantics and schedule information are maintained.

The query scheduling module 820 executes the following steps for scheduling 1010, as summarized in FIG. 10. For purposes of discussion, the order of child nodes of any Boolean node is assumed to be left to right based on some assigned value (i.e., the left most child node has the lowest value).

1) Normalize (1012) the phrase tree by eliminating ANDs of ANDs and ORs of ORs. This is done by collapsing the terms into one another using associativity, e.g. (("a" AND "b") AND "c")=("a" AND "b" AND "c")) and by eliminating AND and OR nodes with only a single child.

2) Recursively traverse the normalized phrase tree, in depth-first order, assigning (1014) to each node a query cost and a plurality of index servers 200 according to the following scheduling rules:

a) To each phrase node, assign the set of index servers 200 associated with the phrase, and a query cost.

b) To each NOT node, assign the set of index servers 200 and the query cost associated with the (unique) child of the node.

c) For each AND node:
  (i) Sort the children nodes in ascending order according to their query costs, such that the leftmost child node of the AND is the one with the least cost;
  (ii) Assign to the AND node the same set of index servers 200 and cost as the child node of the AND with the least query cost.

d) For each OR node:
  (i) If the OR node is the child of an AND node and is not the leftmost child thereof, assign to the OR node the same set of index servers 200 and cost from the node which is immediately to its left;
  (ii) Otherwise, assign to the OR node the same set of index servers 200 of its greatest cost child, but assign it a cost equal to the sum of the costs of its children.

The above scheduling rules make use of the query costs that were previously described. This cost measure can specific to phrases, for example the length of its posting list, or more generalized such as a cost measure associated with the phrase's tier, or even the tier number itself as a proxy for cost. The cost and index server information is accessed from the phrase assignment map. The use of the query costs allows the query scheduling module 820 to schedule the which index servers 200 are used in which order, in order reduce overall processing costs. The rationale for the remaining rules is as follows.

Scheduling rule (c) is the AND rule. An AND node is given the cost of its least cost child node because after the first child node is evaluated (e.g., the phrase posting list for the phrase is retrieved), each successive output of the AND is guaranteed to have less than or equal number of documents as this first child. Hence evaluating the least cost child first (and the remaining children in ascending cost order) means that the evaluation of the AND starts with shortest phrase posting list being sent from the first child's index servers 200 to the next child's index server 200 for intersection, and that each successive intersection list will be no longer than the prior one. This reduces overall communication costs (amount of data being transferred between index servers 200) as well as ensuring the fewest possible number of intersections of phrase posting lists need to be performed for the AND node.

Scheduling rule (d) is the OR rule. An OR node is evaluated by sending parallel execution requests to the index servers 200 assigned to each of the OR node's children. Accordingly, these requests can be sent from whichever index server 200 is responsible for the OR node itself. The left sibling rule (d)(i) is used where the OR node is a child of an AND, because an OR node itself cannot be the child of an OR and a NOT can only have one child. In this case, the AND rule has the result that execution will be at index server assigned to the AND nodes least cost child; this index server is the server for the OR node's left sibling. Accordingly, it is most efficient (lowest cost) to maintain execution on this particular index server 200. If this is not the case, it is most efficient to center evaluation of the OR node so that the most expensive child is local, and the less-expensive children need to transmit their data over the network. The assigned cost is the sum of the OR's children because the number of phrase posting list entries (documents) that are expected to be returned is the sum of that number for the children.

3. Query Optimization

The goal of query optimization 1020 is to restructure the query to minimize computational and network costs. This is done by evaluating 1022 the structure of the schedule tree using a query cost analysis to select between logically equivalent versions of various nodes of the schedule tree. The versions that have the lowest costs are selected for the final schedule tree to be executed. After a restructuring 1022 an optional rescheduling on the restructured nodes may be performed, depending on which query costs analysis is being used. An implementation of this process by the query scheduling module 820 is as follows.

Figure 11A:
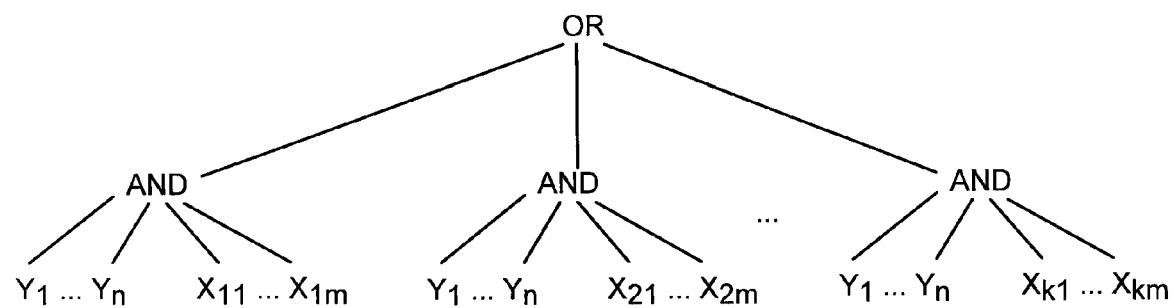
FIG. 11A and FIG. 11B illustrate optimization by factoring of common nodes in a query schedule.
Figure 11B:
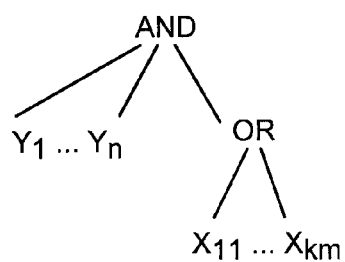

The query scheduling module 820 first executes a breadth-first traversal of the schedule tree, and evaluating each node therein. Where the current node is OR node with at least one AND child node, such that either of the following node forms are matched:

(a) One of the children of the AND is identical to one of the children of the OR, i.e., having the form (A OR (A AND B)); or (b) There are at least two AND children of the OR such that each of the AND children itself has a child in common; i.e., having the form (A AND B) OR (A AND C), then a basic optimization step is attempted. The query scheduling module 820 evaluates cost of the de Morgan inversion of the node to general form ((A AND (B OR C)) using a cost evaluation function. Whichever form of the node has the lower cost (the original OR node or the resulting AND node), is kept in the final schedule tree. The particular cost evaluation function can be selected by the system implementer, based on which query cost measure is being used (e.g., tier based cost, phrase posting list cost, etc.). Three different cost evaluation functions are next described, any one of which may be used to make this decision so long as it is used consistently. The following discussion refers to FIG. 11A showing an OR node whose children are AND nodes, each of which have common children $Y_i$ along with other (unshared) children $X_{ij}$. The de Morgan inversion would replace this tree with the logically equivalent tree shown in FIG. 11B.

Tier-based cost: Where the query costs are a function of the tier for a given phrase, then the de Morgan inversion is performed if and only if, $$\text{minimum}[\text{cost}(Y_i)] \leq \text{minimum}[\text{cost}(X_{ij})], \text{ or if}$$

$$\text{minimum}[\text{cost}(Y_i)] \geq \text{maximum}[\text{cost}(X_{ij})].$$

This means the inversion will be performed where the cost for processing the common children node $Y_i$ is either less than the minimum of the costs for the unshared nodes $X_{ij}$, or greater than the maximum cost of these nodes. The inversion is desirable in this case because it will result in the AND of the $Y_i$ being evaluated en masse and sent to the $X_{ij}$ (in the former case) or the OR of the $X_{ij}$ being evaluated and sent to the $Y_i$ (in the latter case), in both cases eliminating the duplication of effort in evaluating the $Y_i$. If neither of these conditions were satisfied, then evaluating the inverted tree would result in evaluating a higher-cost node (the AND of the $Y_i$) prior to a lower-cost node (the least of the $X_{ij}$) and transmitting the longer posting list over the network, which would be inefficient. If a node is restructured based on outcome of the tier-based cost evaluation, an optional rescheduling (1010) and optimization (1020) of the restructured node can be done; this is useful because the updated tier assignments will be used as the recursive optimization progresses.

Phrase posting list length-based cost: Where the query costs are the lengths of posting list lengths (or a function thereof), then the de Morgan inversion is performed if and only if, $$\text{minimum}[\text{cost}(Y_i)] \leq \text{minimum}[\text{cost}(X_{ij})], \text{ or if}$$

$$\text{minimum}[\text{cost}(Y_i)] \geq \sum_{i=1}^{n} \text{cost}(X_{ij}).$$

This means that the inversion will be performed where the cost of processing the factored node Y is either less than the minimum of the costs for the disjunct nodes X, or greater than the summed cost of these nodes. The rationale is the same as in case (i), but because the costs being used are now the same as those used during scheduling, we can use a better expression for the cost of the OR of the $X_{ij}$. A rescheduling of the restructured node is not necessary in this case.

Subtree cost: A third query cost measure is an evaluation cost of any subtree of a scheduled query tree, which approximates the network load that would be generated by executing that subtree. Such a cost may be calculated as follows:

a) Perform a depth-first recursive descent of the subtree.

b) The evaluation cost of a phrase node is equal to its one of the cost (e.g. phrase posting list length or other a priori cost measure).

c) The subtree cost of an AND node is defined as follows. As noted above, the children nodes of an AND node are ordered from least to most costs. Beginning then from the least cost child node, the child nodes are partitioned into subsequences, each subsequence containing a set of children which have the same assigned set of index servers 200. To each subsequence, assign an evaluation cost equal to the minimum evaluation cost of any child node of that subsequence. The evaluation cost of the AND node is the sum of the costs of its subsequences.

d) For an OR node, an initial evaluation cost of the OR node is assigned that is equal to the sum of the evaluation costs of its children. If the OR node is the child of an AND node, and it is not a member of the AND node's leftmost subsequence, then the evaluation cost of the OR node is the lesser of its initial evaluation cost and the evaluation cost of the subsequence immediately to the left of it. Otherwise, the evaluation cost of an OR node is equal to its initial evaluation cost.

e) The evaluation cost of a NOT node is equal to the evaluation cost of its child.

The subtree cost function has the effect that the de Morgan inversion is be performed if and only if the evaluation cost of the inverted tree is less than the evaluation cost of the original tree. A rescheduling of the restructured node is not necessary in this case.

It should further be noted that if either the phrase posting list length-based cost or the subtree cost function is used, then the optimization stage 1020 can be performed before the scheduling stage 1010.

To help further explain the phrasification, scheduling and optimization processes, the following example is provided. Assume that input query is "New York restaurants OR restaurants". The OR node with "restaurants" can be provided by the user, or by a query expansion source.

The input query has the following Boolean word tree:
(New and York and Restaurant or Restaurants)

The query phrasification module 810 restructures the Boolean word tree as:
(new AND york AND restaurant) OR (new AND york AND restaurants)

The query phrasification module 810 generates the phrasification:
"new york restaurant"
"new york" AND "restaurant"
"new" AND "york restaurant"
"new" AND "york" AND "restaurant"
"new york restaurants"
"new york" AND "restaurants"
"new" AND "york restaurants"
"new" AND "york" AND "restaurants"

The query phrasification module 810 scores each of these phrasification using phrase scoring function, keeping the top N. Assume that the top selected phrases are:
"new york" AND "restaurant"
"new york" AND "restaurants".

These are combined into a Boolean phrase tree (note that in this format, the 'left most' nodes are towards the bottom):
"restaurants"
AND
"new york"
OR
"restaurant"
AND
"new york"

Next, the phrase tree is scheduled by the query scheduling module 820. Assume that the phrase "new york" is assigned to index server #1 (IS1) and has length L1, "restaurant" is assigned to index server #2 (IS2) and has length L2, and "restaurants" is assigned to index server #3 (IS3) and has length L3, where L3+L2<L1. These lengths will be used as the query costs, and thus are assigned to the respective nodes of the phrase tree according to scheduling rule (a):
("restaurants", L3, IS3)
AND
("new york", L1, IS1)
OR
("restaurant", L2, IS2)
AND
("new york", L1, IS1)

Scheduling rule (c) is applied to the AND nodes: the children nodes are sorted by length, and the AND node is assigned to the index server of the leftmost child:
("new york", L1, IS1)
AND: L3, IS3
("restaurants", L3, IS3)
OR
("new york", L1, IS1)
AND: L2, IS2
("restaurant", L2, IS2)
Scheduling rule (d) is applied to the OR node. The result is:
("new york", L1, IS1)
AND: L3, IS3
("restaurants", L3, IS3)
OR: L3+L2, IS2
("new york", L1, IS1)
AND: L2, IS2
("restaurant", L2, IS2)

The OR node is assigned to its most expensive child IS2, as per scheduling rule (d).

Next, the query scheduling module 820 optimizes the schedule tree, beginning with topmost OR node and descend depth-first. The only nontrivial operation is at this OR node, which matches node form (b), (A AND B) OR (A AND C), where A is "new york".

In this example, the query cost is posting list length, so the phrase list length based cost function is used.

Applying this function is it determined that L1>L2+L3. Accordingly, the de Morgan inversion is applied to result in the following schedule tree:
("new york", L1, IS1)
AND: (L2+L3, IS3)
("restaurants", L3, IS3)
OR: L2+L3, IS3
("restaurant", L2, IS2)

In summary, once scheduling 1010 and optimization 1020 are completed, the resulting query schedule 1004 will identify for each node (being a phrase or an operator), the index server(s) 200 (or other server(s)) assigned to execute the search on that node, as well as additional cost information that can be used for further management of the search. The query schedule 825 is passed the query execution module 830.

4. Query Execution

The query execution module 830 of the front end server 140 is responsible for managing the overall execution of the query schedule; this query execution module 830 is called the root query execution module 830. An instance of a query execution module 830 is also present in each index server 200. Each query execution module 830 takes as input the query schedule 825 and provides as an output a list of documents. Each query execution module 830 is further adapted to allow the scheduled query tree to include explicit data nodes that contain a complete posting list; this is how the results from each index server 200 are passed to further index servers 200 for subsequent processing (e.g., intersection, union, negation). The explicit data nodes can also be used to transport additional data (e.g., scheduling information, metadata) to the index servers 200. Because each node of the query schedule 825 includes data that identifies which index servers 200 are to execute the subtree rooted at such node, each query execution module 830 can readily determine whether it is to execute whatever part of the query schedule it receives or pass current subtree to another index server and process its results.

The execution process thus begins with the root query execution module 830 executing on the root node of the query schedule, and proceeds by recursive descent via the query execution modules of the index servers. Each query execution module executes the following algorithm beginning with a root node of a received query schedule:

1) If the current node is not scheduled to execute at the current server:
   (i) forward a subtree rooted at the current node to the server(s) assigned to the current node. The current server is designated a requesting server, and it receives in return one or more document lists from the assigned server(s).
   (ii) Return to the requesting server a document list that results from performing the OR operation (union) on all the document lists received from the assigned servers. In the case of the root query execution module 830, the merged document list serves as the search result set.

2) If the current node is scheduled at the current server, then the following rules are used.
   (i) If the current node is an explicit data node containing a document list, then return the associated explicit data.
   (ii) If the current node is a phrase node, retrieve all index shards present on the current server that represent part of the given phrase, and return the OR (union) of their phrase posting lists.
   (iii) If the current node is an OR node, execute all of the children of this OR node (in parallel, if possible) and return the OR (union) of their results.
   (iv) If the current node is a NOT node, execute its child, and return the negation of its results. This may also be done by returning the original results together with an annotation that the list is to be interpreted as a negation. This is done to avoid having to return the usually large set of all results that are not in a given set.
   (v) If the current node is an AND node, separate the children nodes into two groups: those children which are scheduled to execute on the current server (local group) and those which are scheduled to execute on other servers (remote group).
      1) Execute all of the children in the local group, in parallel if possible, and construct a document list (the "local result") which is their intersection. If there are no children in the remote group, return the local result as the result to the requesting server.
      2) If the are children in the remote group, construct a new AND node whose first child is an explicit data node containing the local result, and whose remaining children are the children of the remote group. Schedule this new node using the scheduling process 1010 and then execute it, returning the result.

The above algorithm, when completed by the various query execution modules yields a final merged document list (at 1(ii)) resulting from the execution by the lower level servers on their respective portions of the query schedule. This document list, with additional document information and annotations serves as the search result set 835.

The result set 835 is passed back to the front end server 140. Referring again to FIG. 1, the front end server 140 ranks the documents in the result set, using a ranking function. As noted above, the phrase posting lists can contain for each document an information retrieval score. In one embodiment, the front end server 140 implements the second scoring algorithm of a bifurcated document relevance scoring model, in which the first scoring algorithm is used during indexing to generate a phrase relevance score for a document with respect to a phrase. The result set 835 includes for each document listed therein, the phrase relevance score of the document with respect to each phrase of the query that the document contained. This set of phrase relevance scores for each document is then input by the front end server 140 into the second scoring algorithm, along with the query. The second scoring algorithm generates a final score for each document based on this input. The documents are than ranked based on the final score. Additional document information can be associated with each document from the document information server 150. This embodiment enables the phrase posting lists to store a very small amount of data for each document. For example, a phrase posting list can store the document identifier and the phrase relevance score, and optionally flags indicating generally where in the document the phrase occurred (e.g., title, body, table). This considerably reduces the size of the phrase posting lists, enables more documents to be indexed, and reduces query access times.

The above process by which the query schedule is passed from one index server to another can be further improved as follows: An explicit data node can only present in a query schedule if its parent is an AND node. This AND node will be scheduled at the same set of servers as some other child thereof, and the explicit data node (i.e., document list) will be intersected with this child. If this child is distributed across multiple index servers—i.e., if the phrase posting list corresponding to that child phrase is divided into multiple shards—it is only necessary to forward to each index server that portion of the document list which has the potential of forming a non-empty intersection with the shard(s) served by the recipient index server. A requesting server can determine which documents need to be transmitted to which recipient server by using the document number of each document and the shard assignment function; this will identify which of its documents could be at the recipient server. For example, consider the query (A AND B), where phrase A is found in a tier containing S1 shards, and phrase B is found in a tier containing $S2 \geq S1$ shards. Then a document in shard m of A, where $0 \leq m < S1$, is guaranteed to never intersect a document in shard n of B, where $0 \leq n < S2$, unless n=m (modulo S1). This immediately reduces the number of communications needed between servers containing shards of A and servers containing shards of B by a factor of S2/S1.

Thus, when a document list is to be transmitted from a requesting server to a plurality of S recipient servers corresponding to S shards of a single posting list, the query execution module of the requesting server processes the document list against the shard assignment function, and determine for each document therein to which recipient server the document should be transmitted; this will result a number of disjoint subsets of the document list, each assigned to a specific index server. For each of these subsets, the requesting query execution module creates a new query that is identical to the received query schedule but in which the explicit data node is replaced by the subset document list.

The query scheduling, optimization and execution process takes advantage of the tiered and shared structure of the index servers 200 to minimize the overall execution costs for any given query. The scheduling and optimization stages use the query cost information to efficiently assign the index servers with respect to their tiers. The query execution stage takes advantage of the sharding of the phrase posting lists to minimize inter-server communications cost, both in terms of reducing the size of the document lists transmitted between index servers, as well as eliminating any processing that would return null results.

Figure 12A:
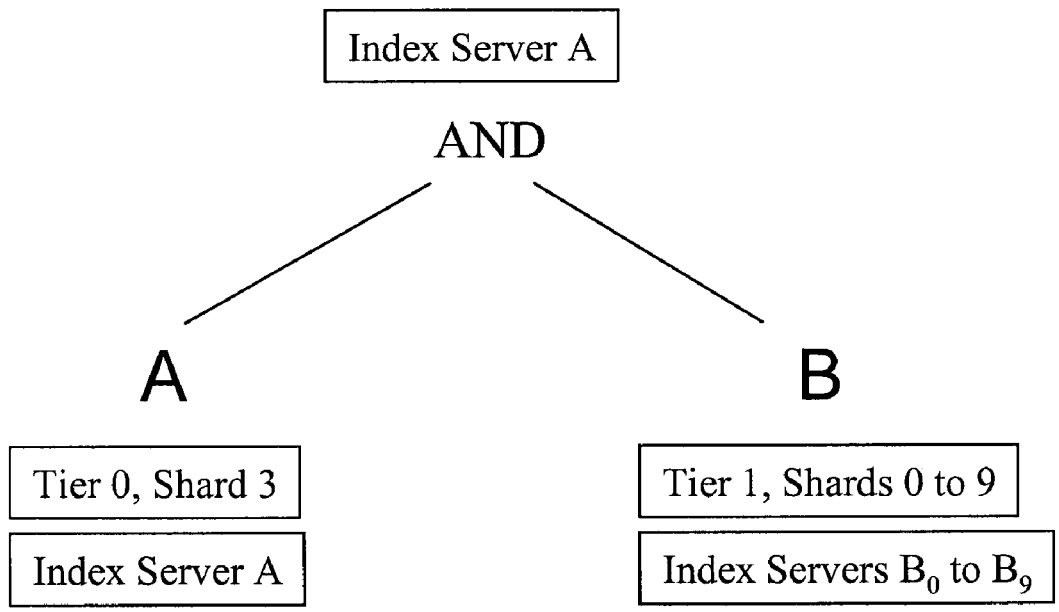
FIG. 12A and FIG. 12B illustrate an example of query execution on one or more index servers.
Figure 12B:
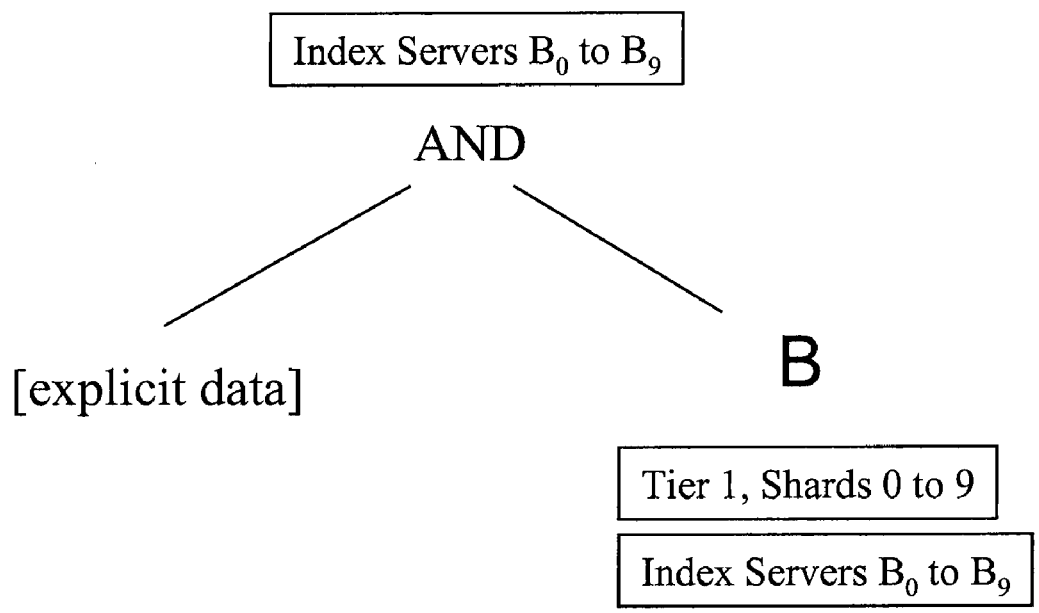

The example of FIGS. 12A and 12B further explains the advantages of the tiers and shards during query processing. FIG. 13A illustrates a query schedule tree for the query (A AND B), where A is a phrase on index server A corresponding to Tier 0, Shard 3, and phrase B is sharded among ten index servers, index servers $B_0$ to $B_9$ corresponding to Tier 1, Shards 0 to 9. The AND node is scheduled at the same server as phrase A, that is at index server A. The pattern of execution is described below.

The root query execution module 830 initiates the execution process. Because the AND node is not assigned to the front end server 140 but instead to index server A, the entire query schedule is transmitted to index server A under rule (1)(i).

Index server A then executes on (A AND B). The topmost node is still the AND node, so rule (2)(v) applies. The first child, phrase A is determined to be a local group under rule (2)(v)(1), and so can be executed locally on index server A. Index server A so it does so by retrieving the phrase posting list for phrase A. The second child, phrase B, is not a local child node, but is assigned to different index server. Under rule (2)(v)(2), the index server A synthesizes a new query, ([explicit data] AND B), as shown in FIG. 12B, where the explicit data is phrase posting list for phrase A. Scheduling this new query node assigns the AND node to the ten index servers $B_0$ to $B_9$ containing shards of phrase B. Index server A thus transmits this revised query schedule, rooted at the revised AND node, to these index servers.

Index servers $B_0$ to $B_9$ then execute the new AND node. Since the index servers are tiered and sharded, it is known which documents in the phrase posting list for phrase A need to be transmitted to which index servers $B_i$: for instance, server $B_0$ contains only those documents whose document identifiers are (0 mod 10), $B_1$ contains the document identifiers which are (1 mod 10), and so forth through server B9 which contains the document identifiers which are (9 mod 10). There may be some index servers $B_i$ for which none of the document identifiers yield the index server's index number. If a document identifier which is (1 mod 10) is sent to server $B_0$, it will never be in the intersection with the documents identifiers for document in this shard of phrase B. Accordingly, index server A partitions the explicit data into no more than ten sublists corresponding to the ten servers to which it will communicate and sends only those that are non-empty. If one of those sublists is (or would be) empty, i.e. there were no hits at all in the posting list for A which were equal to (1 mod 10), then this sublist is not sent to an index server. This demonstrates how sharding decreases network traffic.

Each index server $B_i$ receives the query ([sublist data] AND B), preferably operating in parallel. Each index server $B_i$ determines if the AND node can be executed locally. If so, the node is executed and the index server finds only the sublist data and another node (the local shard of phrase B's posting list) which can be executed locally. It therefore forms the local result, which is the intersection of the sublist and the shard of the phrase posting list, and returns it to the A server, under rule (1)(ii).

Once index server A has received the responses from all index servers $B_i$, it forms the union (OR) of their results, and that is the result of evaluating the AND. It then returns this result back to the root query execution module 830 of the front end server 140.

CONCLUSION

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer implemented method of maintaining a phrase index for a plurality
   of documents in a document collection, the method comprising:
   providing a set of phrase posting lists, each phrase posting list associated with a phrase;
   establishing a plurality of segments, each segment associated with a subset of the plurality of the documents;
   periodically updating each segment by:
      for documents associated with the segment, identifying phrases contained in the document, and updating the phrase posting list for each such phrase to include the document;
      sharding the phrase posting lists for the identified phrases into a plurality of segment shards, each segment shard containing a disjoint subset of the list of documents in the segment that contain the phrase associated with the phrase posting list;
      associating each segment shard with an index shard, such that at least one index shard is associated with a plurality of segment shards, each index shard being served by an index server;
      determining a recently updated segment having updated segment shards;
      for at least one index shard being served:
         determining the index shard's associated updated segment shards, and merging the updated segment shards with the index shard to form an updated index shard; and
         replacing the index shard with the updated index shard.

2. The method of claim 1, wherein at least one document is included in multiple segments.

3. The method of claim 2, further comprising assigning different document identifiers to instances of the document included in different segments.

4. The method of claim 1, further comprising establishing a segment phrase index of phrase posting lists for the documents associated with a segment.

5. The method of claim 1, further comprising determining locations of segment shard files corresponding to the most recent version of each segment.

6. A computer program product stored on a computer readable medium and comprising instructions that when executed cause a computer system to:
   provide a set of phrase posting lists, each phrase posting list associated with a phrase;
   establish a plurality of segments, each segment associated with a subset of a plurality of the documents;
   periodically update each segment by:
      for documents associated with the segment, identifying phrases contained in the document, and updating the phrase posting list for each such phrase to include the document;
      sharding the phrase posting lists for the identified phrases into a plurality of segment shards, each segment shard containing a disjoint subset of the list of documents in the segment that contain the phrase associated with the phrase posting list;
      associating each segment shard with an index shard, such that at least one index shard is associated with a plurality of segment shards, each index shard being served by an index server;
      determine a recently updated segment having updated segment shards;
      for at least one index shard being served:
         determine the index shard's associated updated segment shards, and merging the updated segment shards with the index shard to form an updated index shard; and
         replace the index shard with the updated index shard.

7. The computer program product of claim 6, wherein at least one document is included in multiple segments.

8. The computer program product of claim 7, further comprising instructions that when executed cause the computer system to assign different document identifiers to instances of the document included in different segments.

9. The computer program product of claim 6 further comprising instructions that when executed cause the computer system to establish a segment phrase index of phrase posting lists for the documents associated with a segment.

10. The computer program product of claim 6 further comprising instructions that when executed cause the computer system to determine locations of segment shard files corresponding to the most recent version of each segment.

* * * * *